United States Patent
Forrest et al.

(10) Patent No.: US 11,207,688 B2
(45) Date of Patent: Dec. 28, 2021

(54) ADPATIVE DROPLET OPERATIONS IN AN AM-EWOD DEVICE BASED ON TEST MEASUREMENT OF DROPLET PROPERTIES

(71) Applicant: Sharp Life Science (EU) Limited, Oxford (GB)

(72) Inventors: Peter Matthew Forrest, Oxford (GB); Benjamin James Hadwen, Oxford (GB); Peter Neil Taylor, Oxford (GB); Gregory Gay, Oxford (GB)

(73) Assignee: Sharp Life Science (EU) Limited, Oxford (GB)

( * ) Notice: Subject to any disclaimer, the term of this patent is extended or adjusted under 35 U.S.C. 154(b) by 334 days.

(21) Appl. No.: 16/016,953

(22) Filed: Jun. 25, 2018

(65) Prior Publication Data

US 2019/0388895 A1    Dec. 26, 2019

(51) Int. Cl.
*B01L 3/00*    (2006.01)
*B01F 13/00*    (2006.01)
*G02B 26/00*    (2006.01)

(52) U.S. Cl.
CPC .... *B01L 3/502792* (2013.01); *B01F 13/0071* (2013.01); *B01F 13/0084* (2013.01);
(Continued)

(58) Field of Classification Search
CPC .......... B01L 3/502792; B01L 3/50273; B01L 3/502746; B01L 2200/143;
(Continued)

(56) References Cited

U.S. PATENT DOCUMENTS

| | | |
|---|---|---|
| 6,565,727 B1 | 5/2003 | Shenderov |
| 6,911,132 B2 | 6/2005 | Pamula et al. |

(Continued)

OTHER PUBLICATIONS

Gong et al. (J Gong, C-J Kim, All-electronic droplet generation on-chip with real-time feedback control for EWOD digital microfluidics, Lab Chip, 8 (2008) 898-906) (Year: 2008).*

(Continued)

*Primary Examiner* — Joshua L Allen
(74) *Attorney, Agent, or Firm* — Renner, Otto, Boisselle & Sklar, LLP

(57) ABSTRACT

A control method and related apparatus are disclosed for controlling actuation voltages applied to array elements of an element array on an electrowetting on dielectric (EWOD) device, wherein test metrics are determined and employed for optimizing subsequent droplet manipulation operations. The control method includes the steps of: receiving a liquid droplet onto the element array; applying an electrowetting actuation pattern of actuation voltages to actuate the droplet to modify a footprint of the droplet from a first state having an initial footprint to a second state having a modified footprint; sensing the modified footprint with a sensor; determining a test metric from sensing the modified footprint indicative of one or more droplet properties based on a droplet response of the liquid droplet to the electrowetting actuation pattern; and controlling actuation voltages applied to the array elements based on the test metric. The test metrics may include a transition rate and/or conformance to an actuation pattern.

20 Claims, 17 Drawing Sheets

Column A      Column B      Column C

(52) U.S. Cl.
CPC ..... *B01L 3/50273* (2013.01); *B01L 3/502746* (2013.01); *G02B 26/005* (2013.01)

(58) Field of Classification Search
CPC ..... B01L 2300/0645; B01L 2300/0654; B01L 2400/0427; B01F 13/0071; B01F 13/0084; G02B 26/005; G02B 2207/115
See application file for complete search history.

(56) References Cited

U.S. PATENT DOCUMENTS

| | | | |
|---|---|---|---|
| 7,163,612 B2 | 1/2007 | Sterling et al. | |
| 8,653,832 B2 | 2/2014 | Hadwen et al. | |
| 2010/0096266 A1* | 4/2010 | Kim | B01F 13/0076 204/451 |
| 2010/0194408 A1 | 8/2010 | Sturmer et al. | |
| 2010/0270156 A1* | 10/2010 | Srinivasan | F04B 19/006 204/450 |
| 2011/0203930 A1* | 8/2011 | Pamula | G01N 33/561 204/557 |
| 2014/0057363 A9* | 2/2014 | Sista | B01L 3/502792 436/174 |
| 2014/0144518 A1* | 5/2014 | Bohringer | F15D 1/00 137/13 |
| 2016/0296929 A1* | 10/2016 | Chen | F04B 19/006 |
| 2016/0296934 A1 | 10/2016 | Dong et al. | |
| 2017/0056887 A1 | 3/2017 | Hadwen et al. | |
| 2018/0284424 A1* | 10/2018 | Brown | G02B 26/005 |
| 2019/0201902 A1* | 7/2019 | Fobel | G01N 27/4473 |
| 2019/0217301 A1* | 7/2019 | Hong | B01L 3/502792 |

OTHER PUBLICATIONS

Shih et al. (SCC Shih, R Fobel, P Kumar, AR Wheeler, A feedback control system for high-fidelity digital microfluidics, Lab Chip, 11 (2011) 535-540) (Year: 2011).*
Jie Gao et al.: "An intelligent digital microfluidic system with fuzzy-enhanced feedback for multi-droplet manipulation", Lab on a Chip, vol. 13, No. 3, Nov. 28, 2012, pp. 443-451, DOI: 10.10.39/c2lc41156c.
Chunqiao Li, et al.: "Feedback control system for large scale 2D digital microfluidic platforms", Sensors and Actuators B vol. 255, Sep. 14, 2017, pp. 3616-3622.
"Digital microfluidics: is a true lab-on-a-chip possible?", R.B. Fair, Microfluid Nanofluid (2007) 3:245-281).

\* cited by examiner

Fig. 1: PRIOR ART

Fig. 5
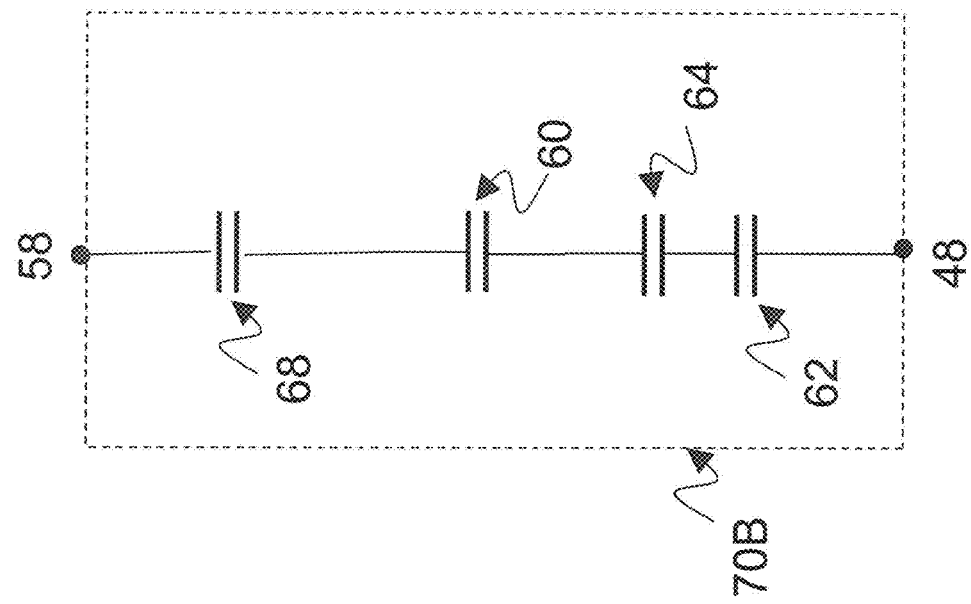
Figure 5B
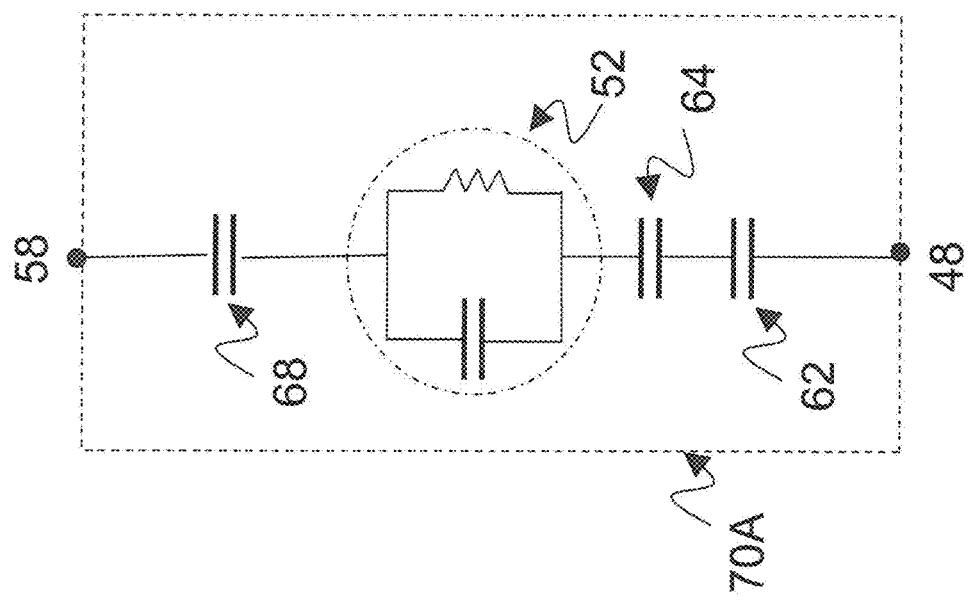
Figure 5A

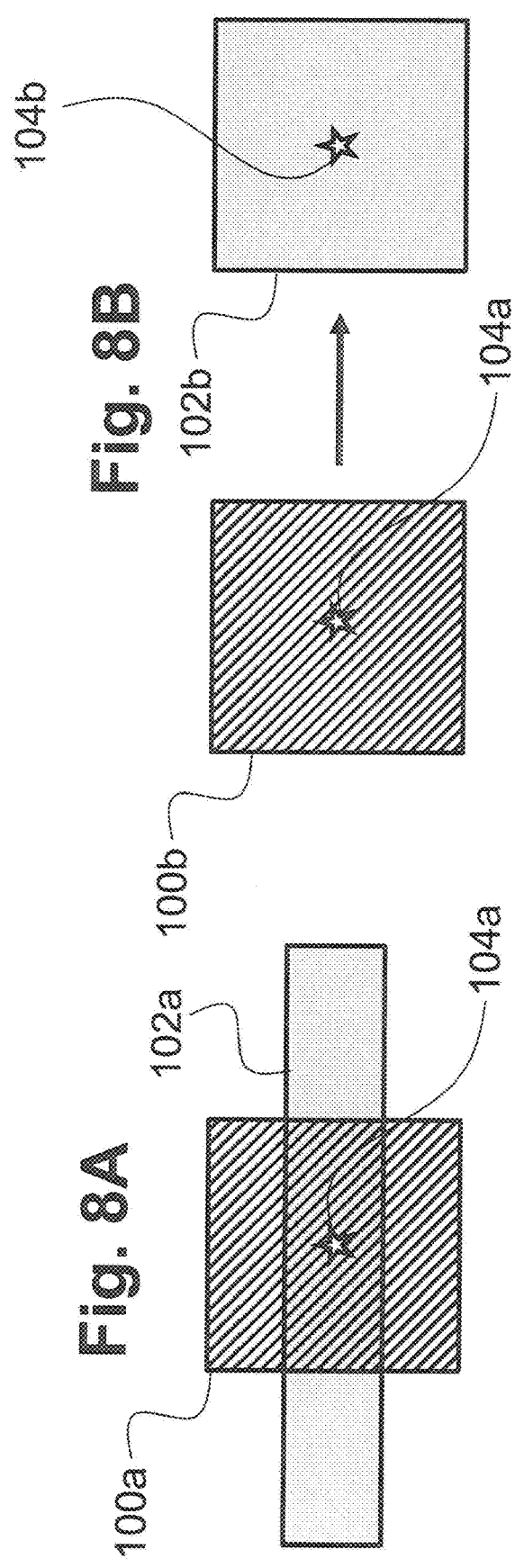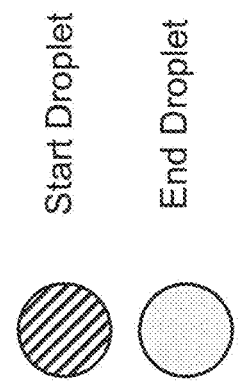

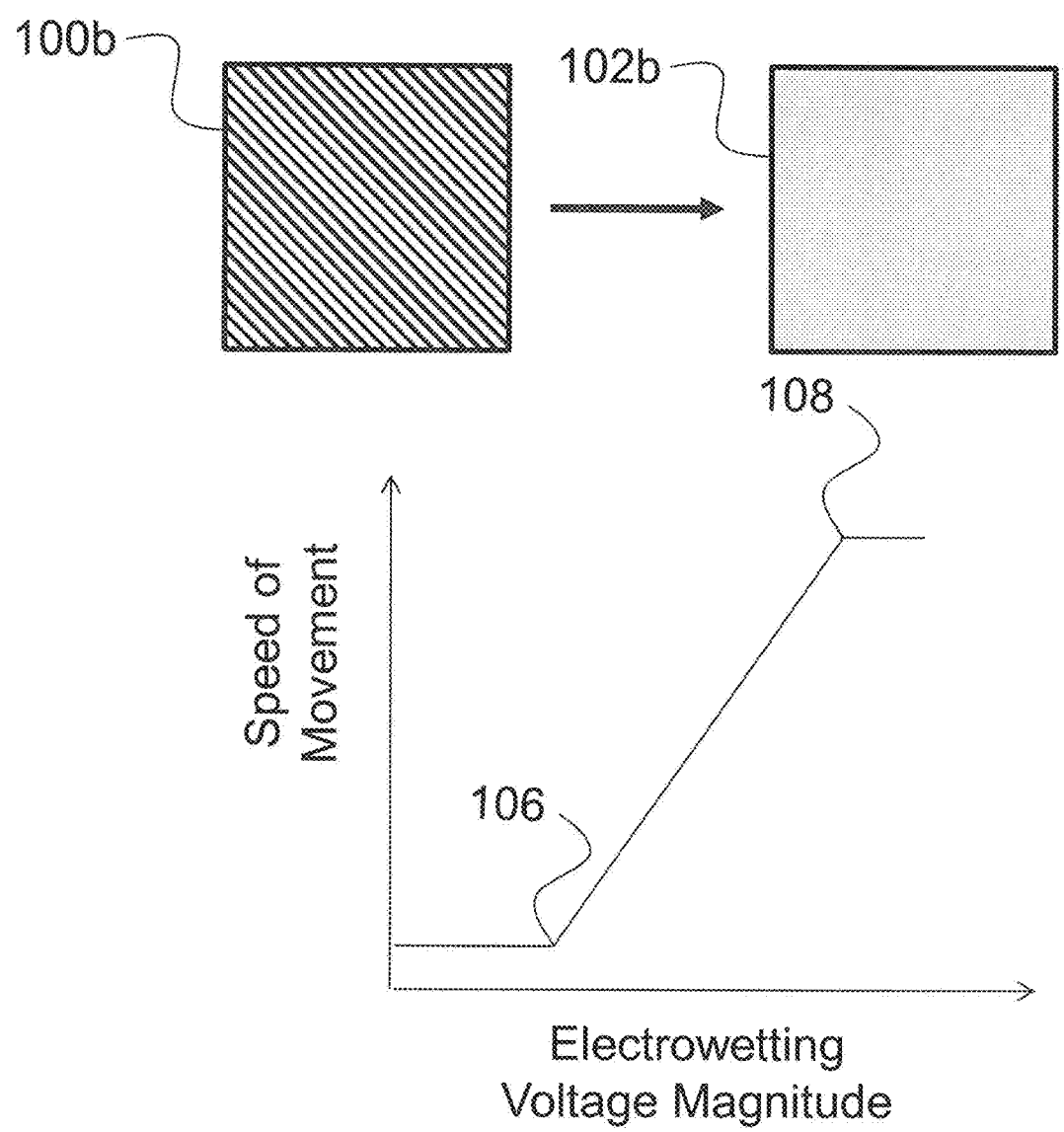

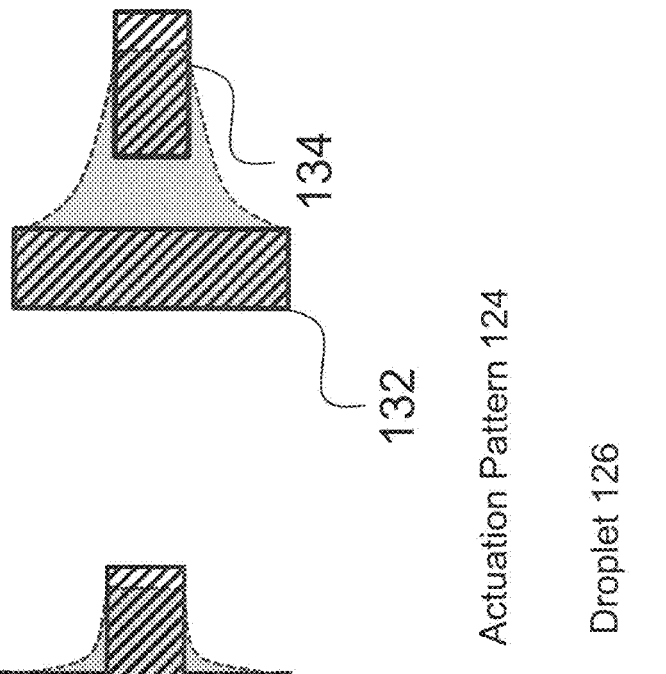
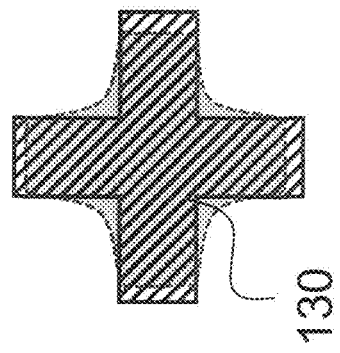
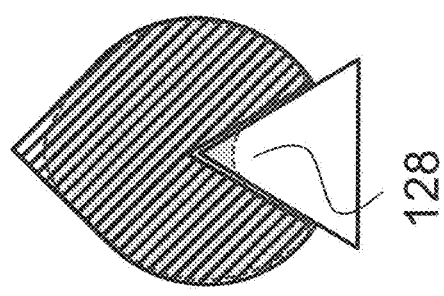

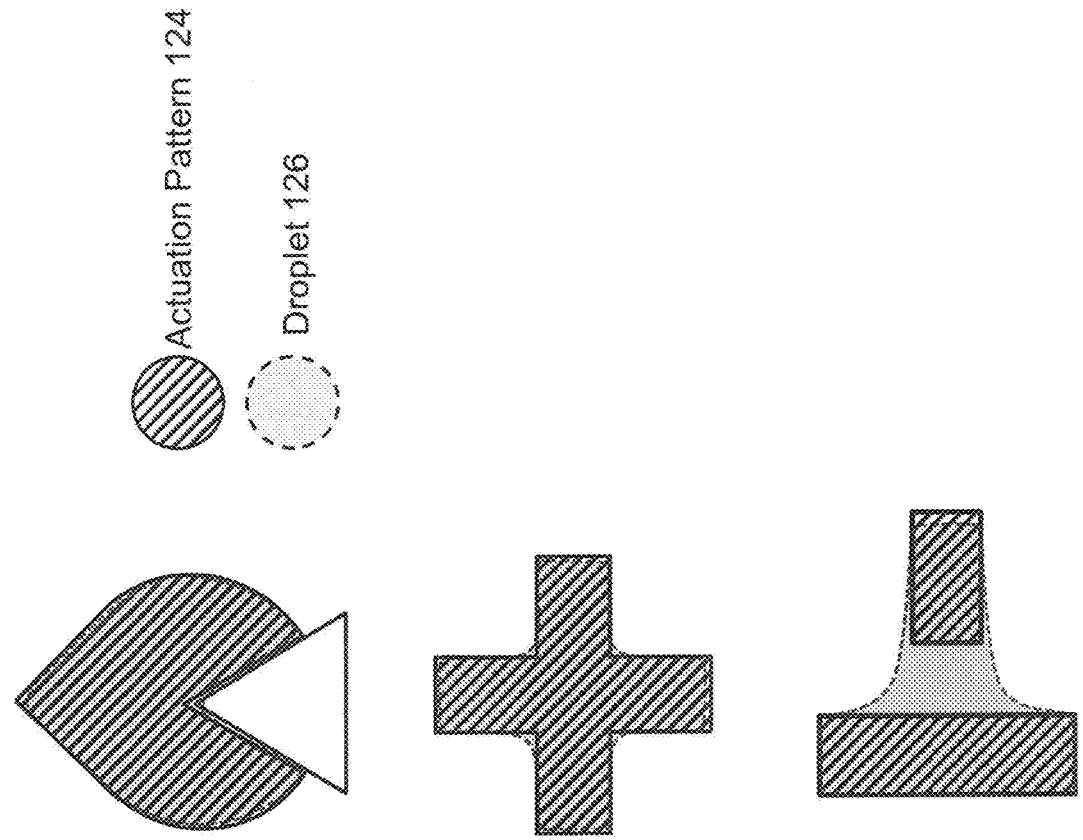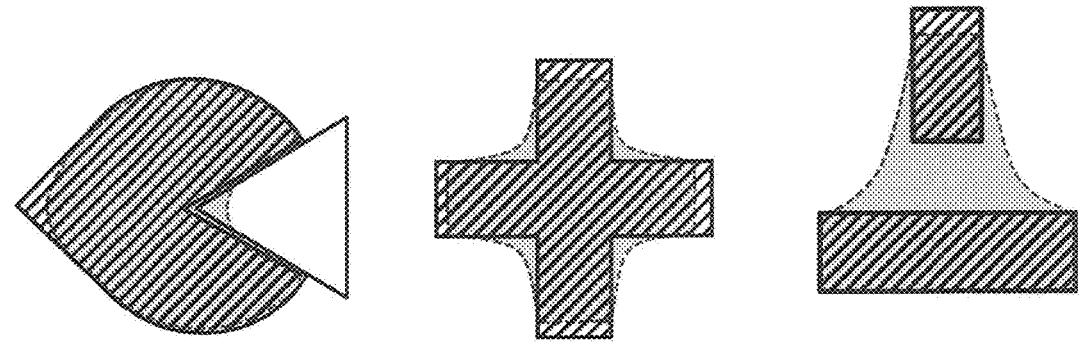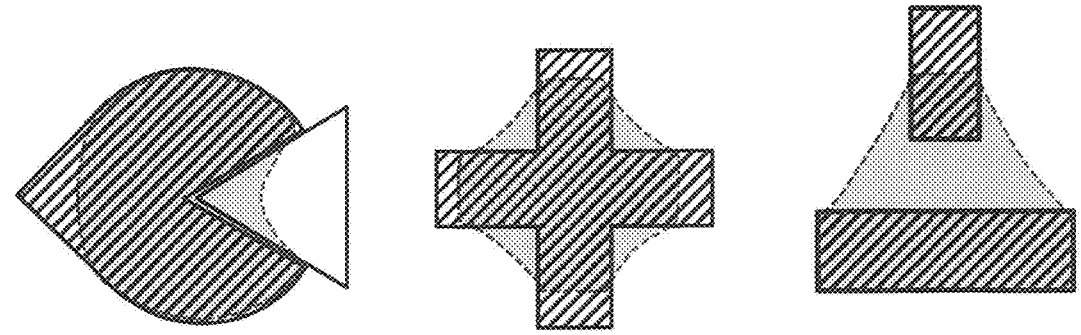
Fig. 12

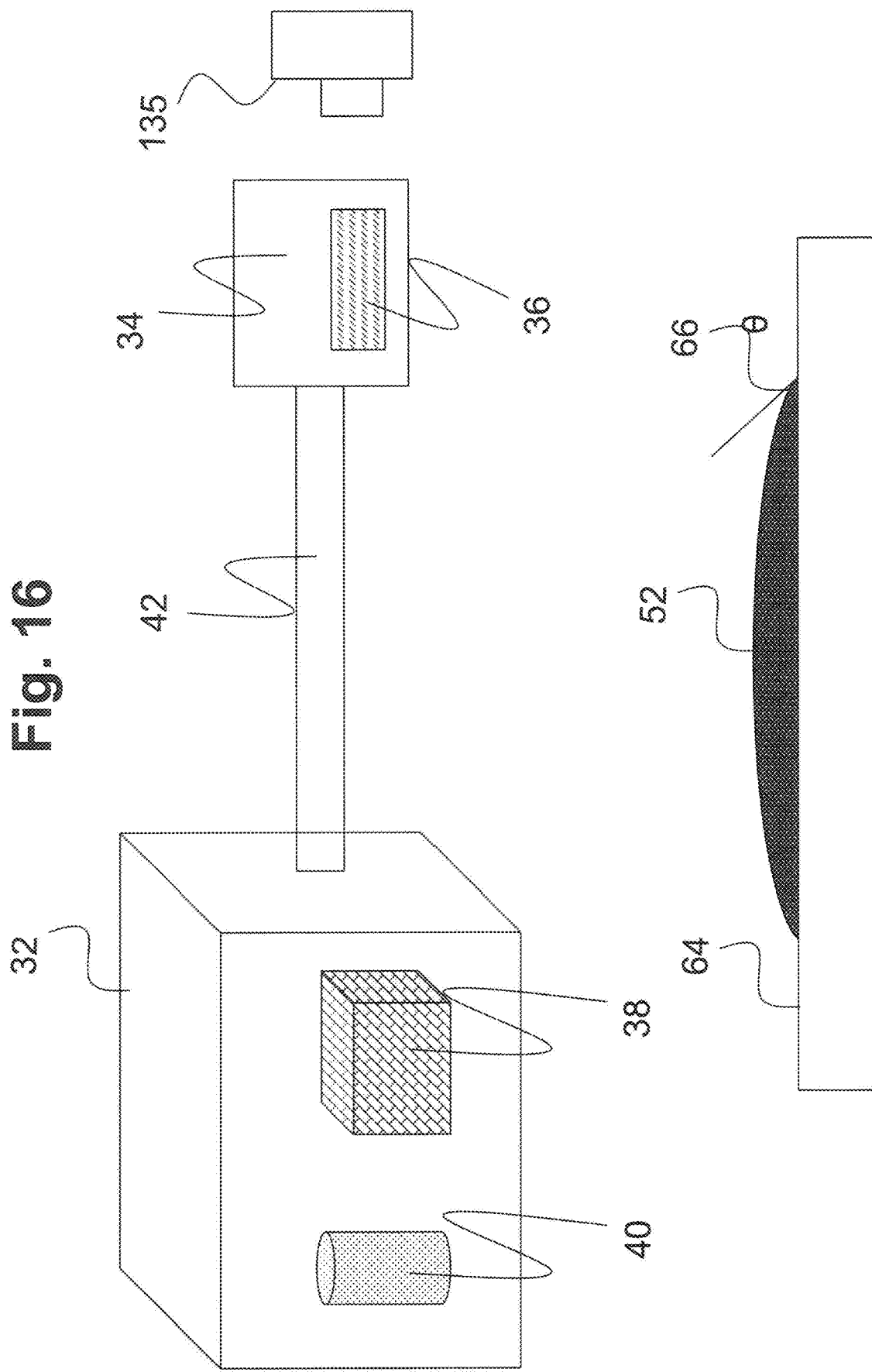

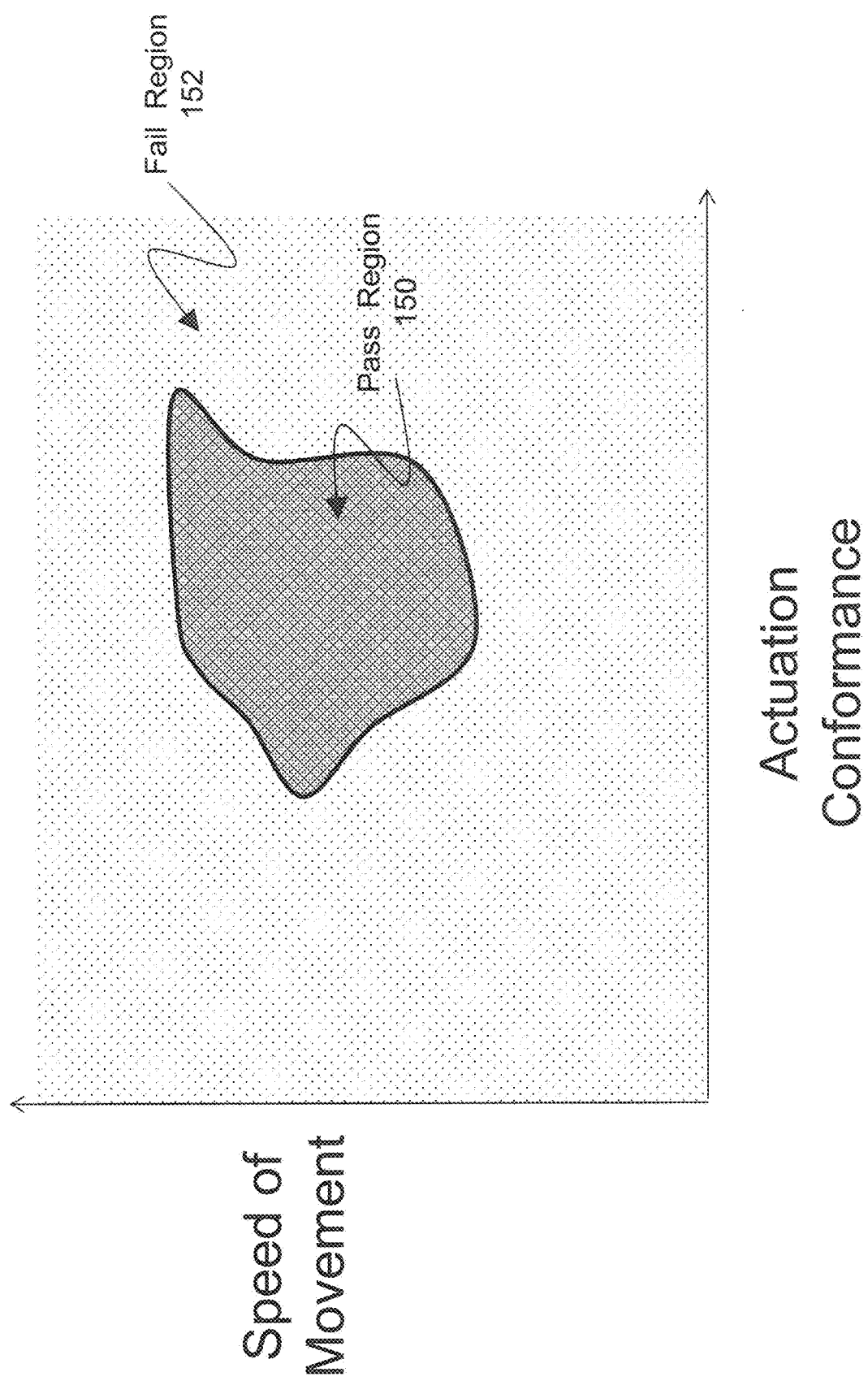

ADPATIVE DROPLET OPERATIONS IN AN AM-EWOD DEVICE BASED ON TEST MEASUREMENT OF DROPLET PROPERTIES

TECHNICAL FIELD

The present invention relates to droplet microfluidic devices, and more specifically to Active Matrix Electrowetting-On-Dielectric (AM-EWOD) devices and control methods for actuating device elements.

BACKGROUND ART

Electrowetting on dielectric (EWOD) is a well-known technique for manipulating droplets of fluid by application of an electric field. Active Matrix EWOD (AM-EWOD) refers to implementation of EWOD in an active matrix array incorporating transistors, for example by using thin film transistors (TFTs). It is thus a candidate technology for digital microfluidics for lab-on-a-chip technology. An introduction to the basic principles of the technology can be found in "Digital microfluidics: is a true lab-on-a-chip possible?", R. B. Fair, Microfluid Nanofluid (2007) 3:245-281).

FIG. 1 shows a part of a conventional EWOD device in cross section. The device includes a lower substrate 10, the uppermost layer of which is formed from a conductive material which is patterned so that a plurality of array element electrodes 12 (e.g., 12A and 12B in FIG. 1) are realized. The electrode of a given array element may be termed the element electrode 12. A liquid droplet 14, including a polar material (which is commonly also aqueous and/or ionic), is constrained in a plane between the lower substrate 10 and a top substrate 16. A suitable gap between the two substrates may be realized by means of a spacer 18, and a non-polar fluid 20 (e.g. oil) may be used to occupy the volume not occupied by the liquid droplet 14. An insulator layer 22 disposed upon the lower substrate 10 separates the conductive element electrodes 12A, 12B from a first hydrophobic coating 24 upon which the liquid droplet 14 sits with a contact angle 26 represented by θ. The hydrophobic coating is formed from a hydrophobic material (commonly, but not necessarily, a fluoropolymer).

On the top substrate 16 is a second hydrophobic coating 28 with which the liquid droplet 14 may come into contact. Interposed between the top substrate 16 and the second hydrophobic coating 28 is a reference electrode 30.

The contact angle θ is defined as shown in FIG. 1, and is determined by the balancing of the surface tension components between the solid-liquid ($\gamma_{SL}$), liquid-gas ($\gamma_{LG}$) and non-ionic fluid ($\gamma_{SG}$) interfaces, and in the case where no voltages are applied satisfies Young's law, the equation being given by:

$$\cos\theta = \frac{\gamma_{SG} - \gamma_{SL}}{\gamma_{LG}} \quad \text{(equation 1)}$$

In operation, voltages termed the EW drive voltages, (e.g. VT, $V_0$ and $V_{00}$ in FIG. 1) may be externally applied to different electrodes (e.g. reference electrode 30, element electrodes 12, 12A and 12B, respectively). The resulting electrical forces that are set up effectively control the hydrophobicity of the hydrophobic coating 24. By arranging for different EW drive voltages (e.g. $V_0$ and $V_{00}$) to be applied to different element electrodes (e.g. 12A and 12B), the liquid droplet 14 may be moved in the lateral plane between the two substrates 10 and 16.

Example configurations and operation of EWOD devices are described in the following. U.S. Pat. No. 6,911,132 (Pamula et al., issued Jun. 28, 2005) discloses a two dimensional EWOD array to control the position and movement of droplets in two dimensions. U.S. Pat. No. 6,565,727 (Shenderov, issued May 20, 2003) further discloses methods for other droplet operations including the splitting and merging of droplets, and the mixing together of droplets of different materials. U.S. Pat. No. 7,163,612 (Sterling et al., issued Jan. 16, 2007) describes how TFT based thin film electronics may be used to control the addressing of voltage pulses to an EWOD array by using circuit arrangements very similar to those employed in AM display technologies.

The approach of U.S. Pat. No. 7,163,612 may be termed "Active Matrix Electrowetting on Dielectric" (AM-EWOD). There are several advantages in using TFT based thin film electronics to control an EWOD array, namely:

Electronic driver circuits can be integrated onto the lower substrate 10.

TFT-based thin film electronics are well suited to the AM-EWOD application. They are cheap to produce so that relatively large substrate areas can be produced at relatively low cost.

TFTs fabricated in standard processes can be designed to operate at much higher voltages than transistors fabricated in standard CMOS processes. This is significant since many EWOD technologies require electrowetting voltages in excess of 20V to be applied.

Various methods of controlling an AM-EWOD device to sense droplets and perform desired droplet manipulations have been described. For example, US 2010/0096266 (Kim et al., published Apr. 22, 2010) describes the use of capacitance detection as real time feedback to control the volume of a droplet being dispensed or split from a liquid reservoir. US 2010/0194408A1 (Sturmer et al., published Aug. 5, 2010) describes the use of capacitance detection as real time feedback to determine whether a droplet operation has been successful. US 2017/0056887 (Hadwen et al., published Mar. 2, 2017) describes the use of capacitance detection to sense dynamic properties of reagents as a way for determining the output of an assay.

An issue with conventional AM-EWOD devices is that different liquids have different physical properties, such as for example viscosity, conductivity, surface tension, and the like, and these physical properties affect how the droplets respond to actuation by electrowetting forces. These physical properties of a given liquid can also vary with environmental conditions, such as for example temperature, pressure, and humidity level (with temperature being particularly significant). Differences in liquid properties and environmental conditions makes the definition of fully generic droplet operations, i.e. operations that work reliably for every size of droplet, environmental conditions, and droplet constitution, difficult to achieve.

Often, droplet operations, and particularly splitting a droplet and dispensing droplets from a liquid reservoir, have to include liquid-dependent and/or condition-dependent parameters that must be pre-defined by a user. The requirement for a user to pre-define operational parameters for droplet manipulations is difficult and time consuming, and can undermine device performance if the operational parameters are pre-defined incorrectly. This lack of automation to optimize device operations is a point of significant inefficiency of AM-EWOD devices that is not adequately accounted for in conventional configurations.

SUMMARY OF INVENTION

The present invention pertains to enhanced control systems and methods for the actuation of array elements in an EWOD device, and AM-EWOD devices in particular. The control system automates the selection of liquid-dependent and condition-dependent parameters of droplet manipulation operations so as to reduce or eliminate inefficiencies in conventional devices referenced above, and does so to effectively account for variations in liquid properties and environmental conditions. In this manner, performance efficiency and reliability of droplet manipulation operations on an AM-EWOD device are improved.

In exemplary embodiments, to perform a desired droplet manipulation operation, an automated test measurement is performed to determine one or more metrics indicative of the response of the liquid droplets to electrowetting actuation. The one or more metrics, for example, may be indicative of the physical properties of the liquid and/or the oil in which the liquid is immersed, and/or the environmental operating conditions (e.g., temperature). The measured metrics typically may be stored by the AM-EWOD system, and used later in the system operations for making further decisions as to how the droplet manipulation operations should proceed. The appropriate droplet operations then may be selected from a library of stored operations, or otherwise determined or calculated based on the measured test metrics so that a desired droplet manipulation operation is optimized for particular liquid properties and environmental conditions.

To perform the test measurements, an actuation pattern is applied to a droplet. The actuation pattern may have a different shape, different dimensions, a concavity and/or the like as compared to the droplet when the actuation pattern is not applied. The conformance level of a droplet to the actuation pattern and/or a transition rate from the non-actuated state will vary dependently on the actuation potential and frequency of the applied actuation voltage, a physical property of the liquid, and/or the environmental conditions of operation. A sensor measurement is taken once the droplet has reached a static or equilibrium state. The conformance of the liquid droplet to the actuation pattern, and/or a time response to transition to the equilibrium state, is measured and recorded as a metric describing the response of the droplet to the electrowetting actuation voltage. The metric is then used to devise an optimum droplet manipulation operation algorithm. The droplet manipulation operation algorithm may be calculated by the system or selected from a pre-defined library of droplet manipulation operations stored in the system memory.

Differences between the variants of droplet operation encoded in the calculation parameters or stored library may include for example:
(a) variants in the constant-rate electrowetting actuation sequences;
(b) variations in the time between frames of the electrowetting actuation sequence;
(c) variations in a scheme of adaptive electrowetting patterns, e.g., the actuation pattern itself is selected depending upon the droplet response, whereby the pattern is chosen in response the sensor measurement;
(d) variations in the electrowetting actuation voltage magnitude or voltage AC operating frequency; and
(e) variations in the temperature of the device, for example the system may be heated to make the desired droplet manipulation easier to perform.

Embodiments of the present disclosure are advantageous over conventional configurations by performing a test measurement and optimizing subsequent droplet manipulation operations, and thus device performance such as operation reproducibility, speed of execution, and reliability are improved. The enhanced performance is significant because the optimum droplet manipulation operation may be very dependent on the characteristics of the liquid and on the environmental conditions, which may be variable in the field.

An aspect of the invention, therefore, is a control method for controlling actuation voltages applied to array elements of an element array on an electrowetting on dielectric (EWOD) device, wherein test metrics are determined and employed for optimizing subsequent droplet manipulation operations. In exemplary embodiments, the control method includes the steps of: receiving a liquid droplet onto the element array; applying an electrowetting actuation pattern of actuation voltages to actuate the droplet to modify a footprint of the droplet from a first state having an initial footprint to a second state having a modified footprint; sensing the modified footprint with a sensor; determining a test metric from sensing the modified footprint indicative of one or more droplet properties based on a droplet response of the liquid droplet to the electrowetting actuation pattern; and controlling actuation voltages applied to the array elements based on the test metric.

In exemplary embodiments, the test metric may include a transition rate from the first state to the second state, and/or a degree of conformance of the second footprint of the droplet with the electrowetting actuation pattern. The test measurements may be repeated for multiple different electrowetting voltage magnitudes, for multiple different electrowetting voltage AC frequencies, and/or at different temperatures. The test metric then may be determined based on a droplet response of the droplet at the different electrowetting voltage magnitudes, electrowetting voltage AC frequencies, and/or temperatures.

Another aspect of the invention is a microfluidic system including: an electrowetting on dielectric (EWOD) device including an element array configured to receive one or more liquid droplets, the element array comprising a plurality of individual array elements; a control system configured to control actuation voltages applied to the element array to perform manipulation operations as to the liquid droplets; and a sensor for sensing a state of the liquid droplets. The control system is configured to perform the steps of the control method according to any of the embodiments. In exemplary embodiments, the sensor is an optical sensor external from the EWOD device and/or sensor circuitry integrated into array element circuitry of each of the individual array elements. The control methods may be performed by the control system executing program code stored on a non-transitory computer readable medium.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

BRIEF DESCRIPTION OF DRAWINGS

FIG. 5A is a drawing depicting a circuit representation of the electrical load presented at the element electrode when a liquid droplet is present.

FIG. 5B is a drawing depicting a circuit representation of the electrical load presented at the element electrode when no liquid droplet is present.

FIG. 8A, FIG. 8B, and FIG. 8C are drawings depicting an exemplary embodiment of measuring a droplet response to an actuation pattern that is suitable for measuring a droplet time response metric.

FIG. 9 is a drawing depicting a relationship of transition rate versus electrowetting voltage magnitude, for an example transition of movement of a droplet of a given shape.

FIG. 11A, FIG. 11B, and FIG. 11C are drawings depicting an exemplary embodiment of measuring a droplet response to an actuation pattern that is suitable for measuring a metric of droplet conformance with a particularly shaped actuation pattern.

FIG. 12 is a drawing depicting different degrees of conformance as measured against the actuation patterns of FIGS. 11A-11C.

FIG. 16 is a drawing depicting a variation on the EWOD based microfluidic system of FIG. 15, in which the optical sensor is mounted to the side of the device to measure a side profile of the droplet.

FIG. 17 is a drawing depicting an algorithm for determining a fault condition.

DESCRIPTION OF EMBODIMENTS

Figure 1:
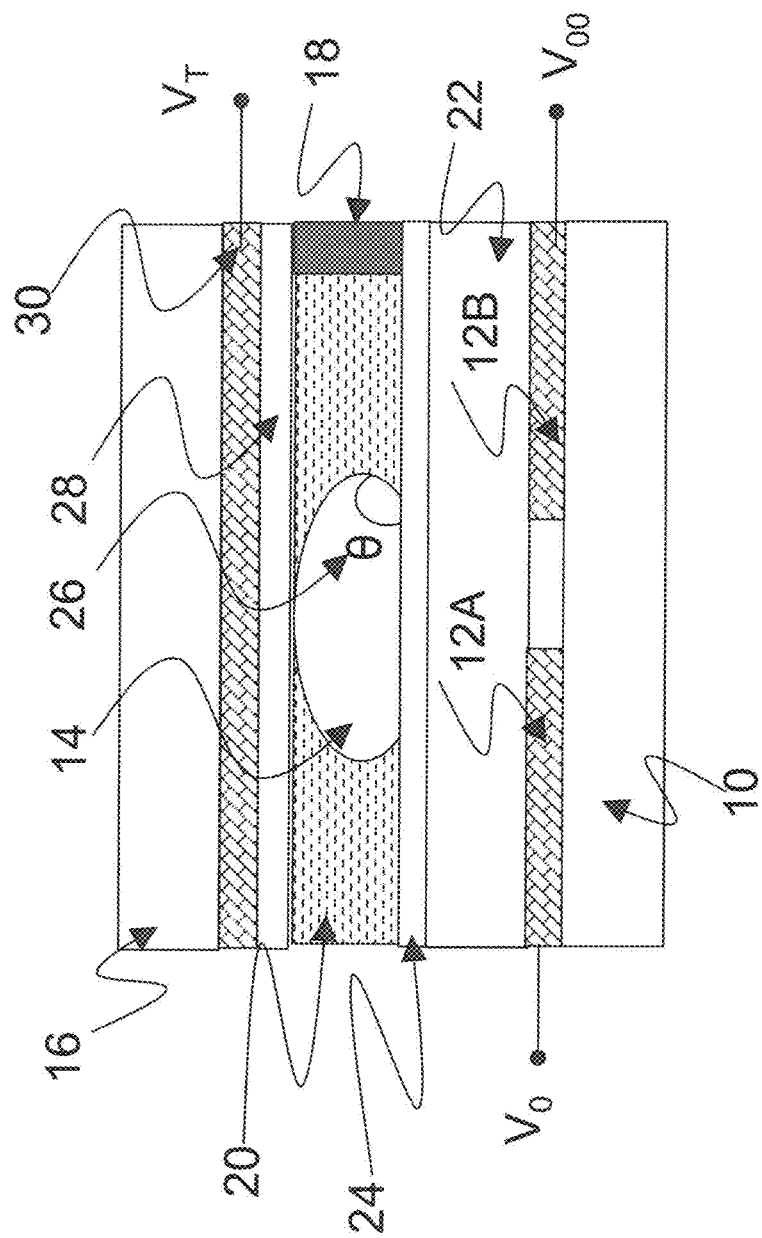
FIG. 1 is a drawing depicting a conventional EWOD device in cross-section.

Embodiments of the present invention will now be described with reference to the drawings, wherein like reference numerals are used to refer to like elements throughout. It will be understood that the figures are not necessarily to scale.

Figure 2:
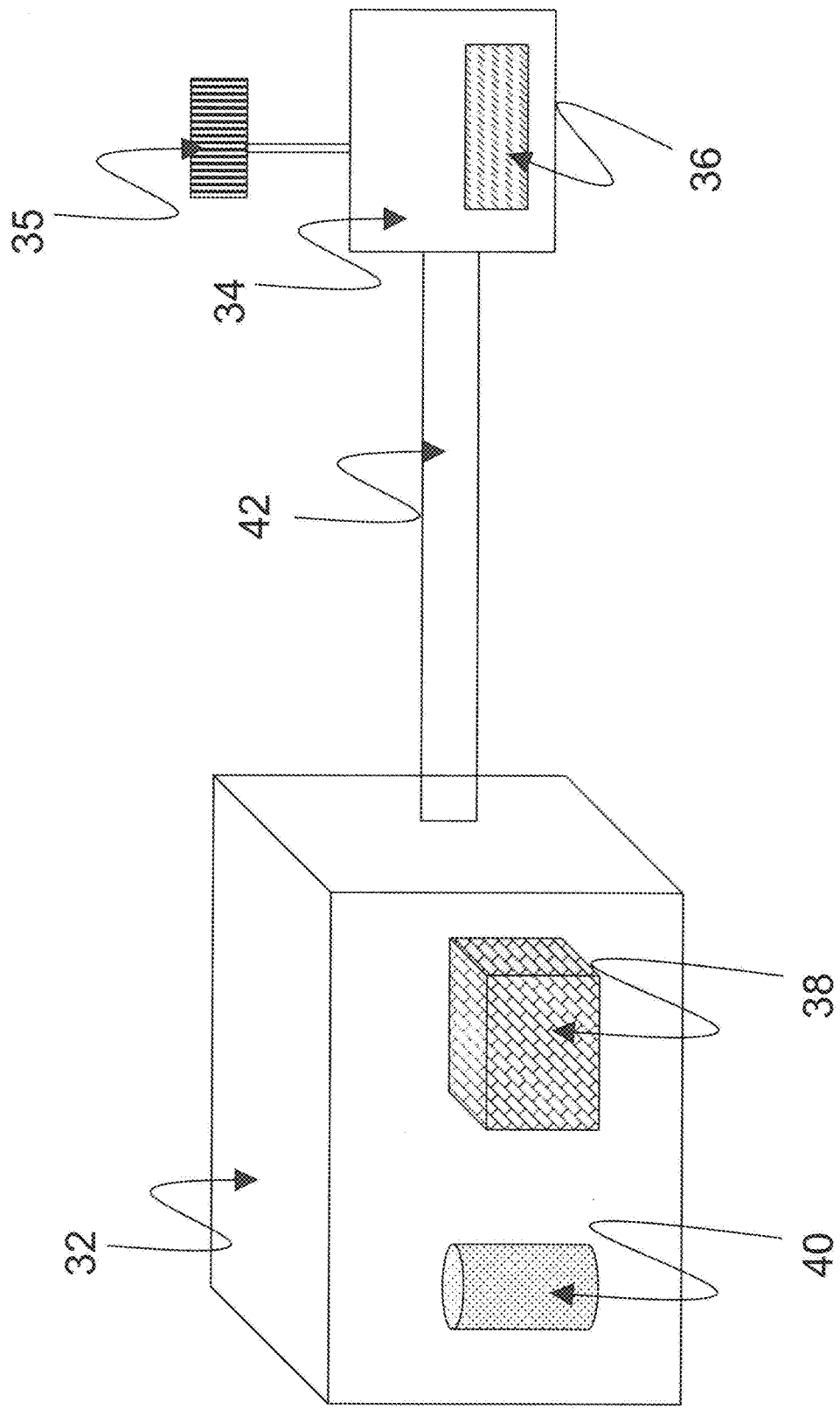
FIG. 2 is a drawing depicting an exemplary EWOD based microfluidic system.

FIG. 2 is a drawing depicting an exemplary EWOD based microfluidic system. In the example of FIG. 2, the measurement system includes a reader 32 and a cartridge 34. The cartridge 34 may contain a microfluidic device, such as an EWOD or AM-EWOD device 36, as well as (not shown) fluid input ports into the device and an electrical connection as are conventional. The fluid input ports may perform the function of inputting fluid into the AM-EWOD device 36 and generating droplets within the device, for example by dispensing from input reservoirs as controlled by electrowetting. As further detailed below, the microfluidic device includes an electrode array configured to receive the inputted fluid droplets.

The microfluidic system further may include a control system configured to control actuation voltages applied to the electrode array of the microfluidic device to perform manipulation operations to the fluid droplets. For example, the reader 32 may contain such a control system configured as control electronics 38 and a storage device 40 that may store any application software and any data associated with the system. The control electronics 38 may include suitable circuitry and/or processing devices that are configured to carry out various control operations relating to control of the AM-EWOD device 36, such as a CPU, microcontroller or microprocessor.

Among their functions, to implement the features of the present invention, the control electronics may comprise a part of the overall control system that may execute program code embodied as a control application within the storage device 40. It will be apparent to a person having ordinary skill in the art of computer programming, and specifically in application programming for electronic control devices, how to program the control system to operate and carry out logical functions associated with the stored control application. Accordingly, details as to specific programming code have been left out for the sake of brevity. The storage device 40 may be configured as a non-transitory computer readable medium, such as random access memory (RAM), a read-only memory (ROM), an erasable programmable read-only memory (EPROM or Flash memory), or any other suitable medium. Also, while the code may be executed by control electronics 38 in accordance with an exemplary embodiment, such control system functionality could also be carried out via dedicated hardware, firmware, software, or combinations thereof, without departing from the scope of the invention.

The control system may be configured to perform some or all of the following functions:

Define the appropriate timing signals to manipulate liquid droplets on the AM-EWOD device 36.

Interpret input data representative of sensor information measured by a sensor or sensor circuitry associated with the AM-EWOD device 36, including computing the locations, sizes, centroids and perimeters of liquid droplets on the AM-EWOD device 36.

Use calculated sensor data to define the appropriate timing signals to manipulate liquid droplets on the AM-EWOD device 36, i.e. acting in a feedback mode.

Provide for implementation of a graphical user interface (GUI) whereby the user may program commands such as droplet operations (e.g. move a droplet), assay operations (e.g. perform an assay), and the GUI may report the results of such operations and other system information to the user.

In the example of FIG. 2, an external sensor module 35 is provided for sensing droplet properties. For example, optical sensors as are known in the art may be employed as external sensors for sensing droplet properties. Suitable optical sensors include camera devices, light sensors, charged coupled devices (CCD) and similar image sensors, and the like. As further detailed below, a sensor alternatively may be configured as internal sensor circuitry incorporated as part of the drive circuitry in each array element. Such sensor circuitry may sense droplet properties by the detection of an electrical property at the array element, such as impedance or capacitance.

The control system, such as via the control electronics 38, may supply and control the actuation voltages applied to the electrode array of the microfluidics device 36, such as required voltage and timing signals to perform droplet manipulation operations and sense liquid droplets on the AM-EWOD device 36. The control electronics further may execute the application software to generate and output control voltages for droplet sensing and performing sensing operations. The reader 32 and cartridge 34 may be electrically connected together while in use, for example by a cable of connecting wires 42, although various other methods of providing electrical communication may be used as are known to those of ordinary skill in the art.

Figure 3:
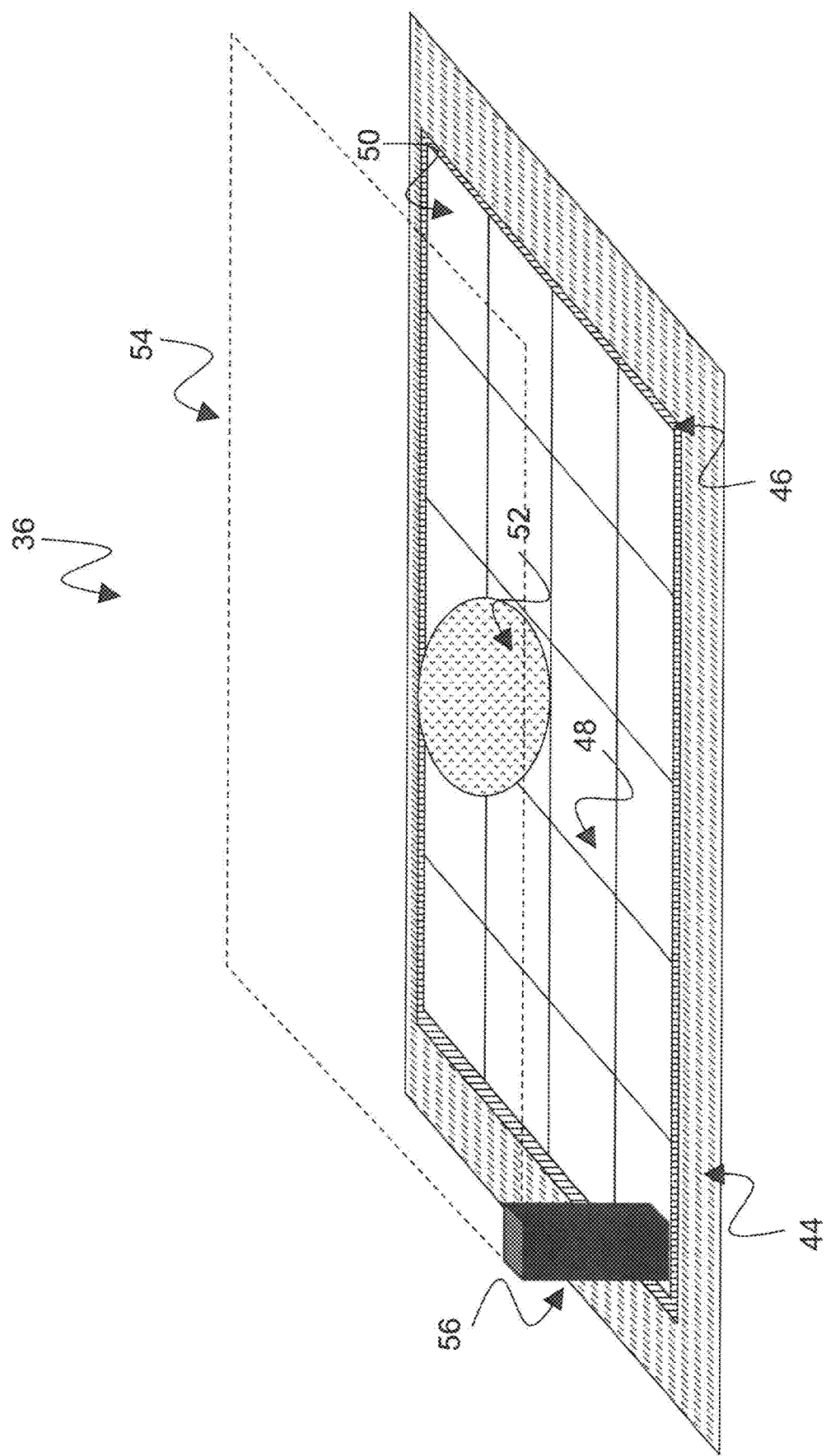
FIG. 3 is a drawing depicting an exemplary AM-EWOD device in schematic perspective.

FIG. 3 is a drawing depicting additional details of the exemplary AM-EWOD device 36 in schematic perspective. The AM-EWOD device 36 has a lower substrate 44 with thin film electronics 46 disposed upon the lower substrate 44. The thin film electronics 46 are arranged to drive array element electrodes 48. A plurality of array element electrodes 48 are arranged in an electrode or element array 50, having X by Y array elements where X and Y may be any integer. A liquid droplet 52 which may include any polar liquid and which typically may be aqueous, is enclosed between the lower substrate 44 and a top substrate 54 separated by a spacer 56, although it will be appreciated that multiple liquid droplets 52 can be present.

Figure 4:
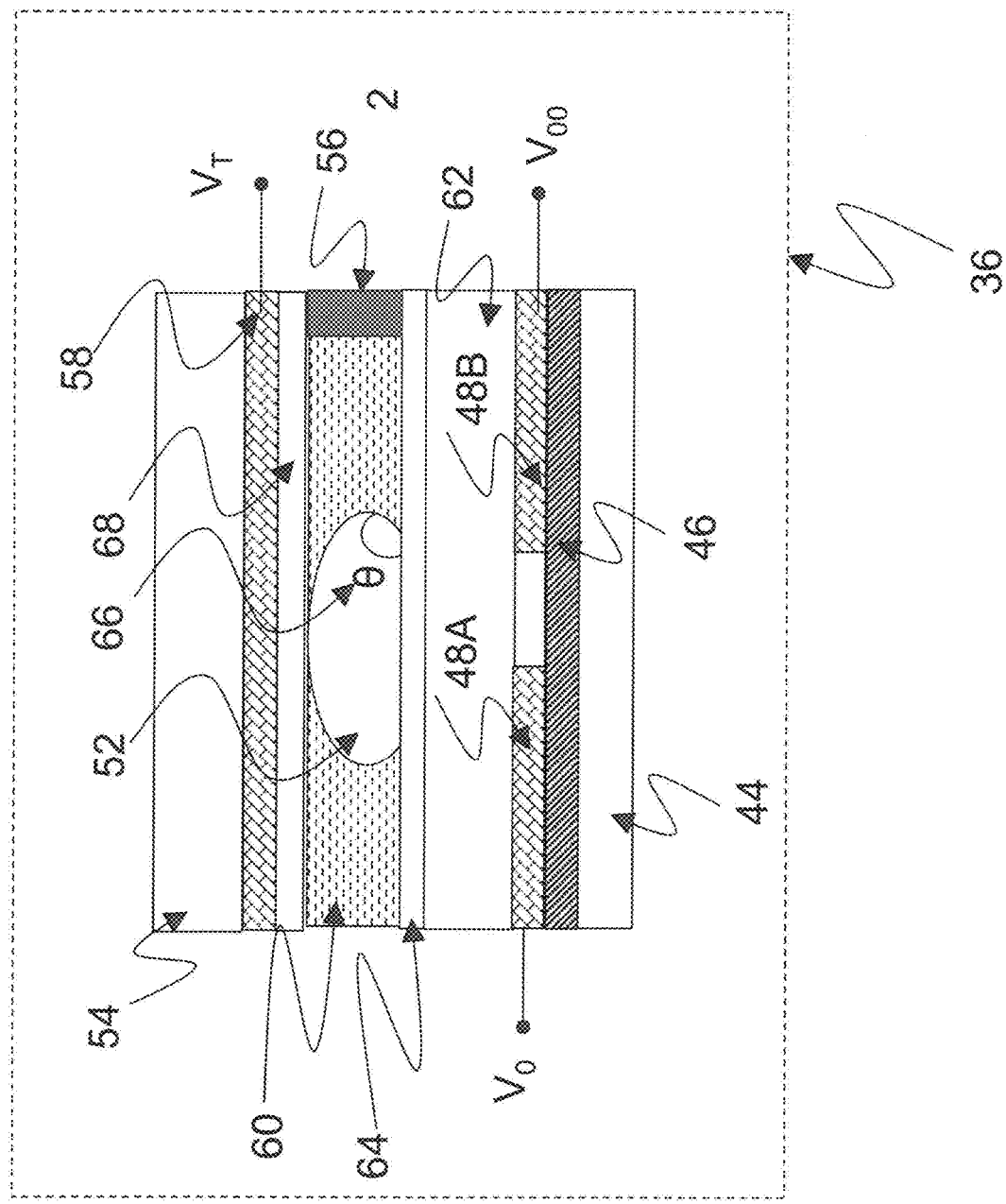
FIG. 4 is a drawing depicting a cross section through some of the array elements of the exemplary AM-EWOD device of FIG. 3.

FIG. 4 is a drawing depicting a cross section through some of the array elements of the exemplary AM-EWOD 36 device of FIG. 3. In the portion of the AM-EWOD device depicted in FIG. 4, the device includes a pair of the array element electrodes 48A and 48B that are shown in cross section that may be utilized in the electrode or element array 50 of the AM-EWOD device 36 of FIG. 3. The device configuration is similar to the conventional configuration shown in FIG. 1, with the AM-EWOD device 36 further incorporating the thin-film electronics 46 disposed on the lower substrate 44, which is separated from the upper substrate 54 by the spacer 56. The uppermost layer of the lower substrate 44 (which may be considered a part of the thin film electronics layer 46) is patterned so that a plurality of the array element electrodes 48 (e.g. specific examples of array element electrodes are 48A and 48B in FIG. 4) are realized. The term element electrode 48 may be taken in what follows to refer both to the physical electrode structure 48 associated with a particular array element, and also to the node of an electrical circuit directly connected to this physical structure. A reference electrode 58 is shown in FIG. 4 disposed upon the top substrate 54, but the reference electrode alternatively may be disposed upon the lower substrate 44 to realize an in-plane reference electrode geometry. The term reference electrode 58 may also be taken in what follows to refer to both or either of the physical electrode structure and also to the node of an electrical circuit directly connected to this physical structure.

Also similarly to the conventional structure of FIG. 1, in the AM-EWOD device 36, a non-polar fluid 60 (e.g. oil) may be used to occupy the volume not occupied by the liquid droplet 52. An insulator layer 62 may be disposed upon the lower substrate 44 that separates the conductive element electrodes 48A and 48B from a first hydrophobic coating 64 upon which the liquid droplet 52 sits with a contact angle 66 represented by θ. The hydrophobic coating is formed from a hydrophobic material (commonly, but not necessarily, a fluoropolymer). On the top substrate 54 is a second hydrophobic coating 68 with which the liquid droplet 52 may come into contact. The reference electrode 58 is interposed between the top substrate 54 and the second hydrophobic coating 68.

FIG. 5A shows a circuit representation of the electrical load 70A between the element electrode 48 and the reference electrode 58 in the case when a liquid droplet 52 is present. The liquid droplet 52 can usually be modeled as a resistor and capacitor in parallel. Typically, the resistance of the droplet will be relatively low (e.g. if the droplet contains ions) and the capacitance of the droplet will be relatively high (e.g. because the relative permittivity of polar liquids is relatively high, e.g. ~80 if the liquid droplet is aqueous). In many situations the droplet resistance is relatively small, such that at the frequencies of interest for electrowetting, the liquid droplet 52 may function effectively as an electrical short circuit. The hydrophobic coatings 64 and 68 have electrical characteristics that may be modelled as capacitors, and the insulator 62 may also be modelled as a capacitor. The overall impedance between the element electrode 48 and the reference electrode 58 may be approximated by a capacitor whose value is typically dominated by the contribution of the insulator 62 and hydrophobic coatings 64 and 68 contributions, and which for typical layer thicknesses and materials may be on the order of a pico-Farad in value.

FIG. 5B shows a circuit representation of the electrical load 70B between the element electrode 48 and the reference electrode 58 in the case when no liquid droplet is present. In this case the liquid droplet components are replaced by a capacitor representing the capacitance of the non-polar fluid 60 which occupies the space between the top and lower substrates. In this case the overall impedance between the element electrode 48 and the reference electrode 58 may be approximated by a capacitor whose value is dominated by the capacitance of the non-polar fluid and which is typically small, on the order of femto-Farads.

For the purposes of driving and sensing the array elements, the electrical load 70A/70B overall functions in effect as a capacitor, whose value depends on whether a liquid droplet 52 is present or not at a given element electrode 48. In the case where a droplet is present, the capacitance is relatively high (typically of order pico-Farads), whereas if there is no liquid droplet present the capacitance is low (typically of order femto-Farads). If a droplet partially covers a given electrode 48 then the capacitance may approximately represent the extent of coverage of the element electrode 48 by the liquid droplet 52.

Figure 6:
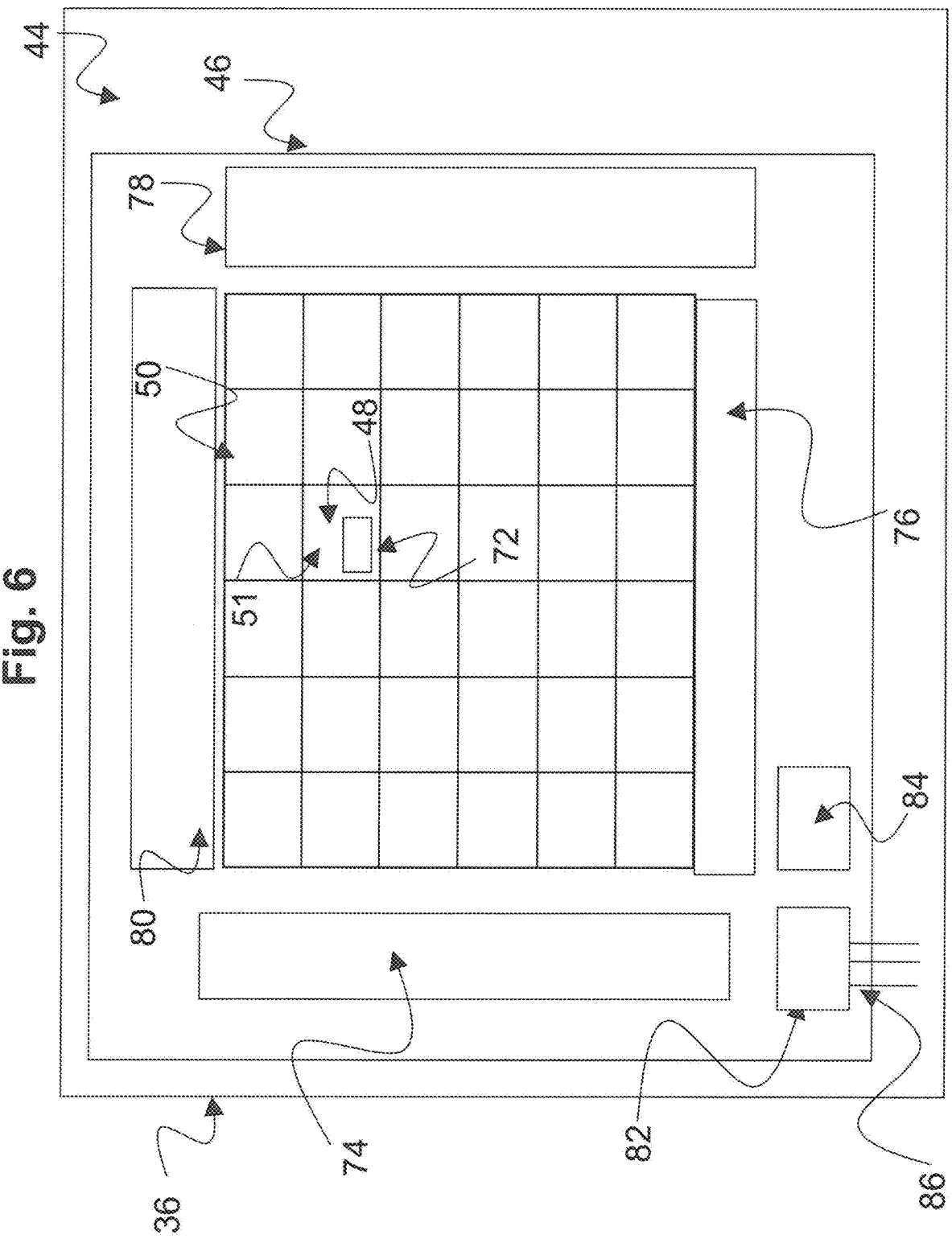
FIG. 6 is a drawing depicting an exemplary arrangement of thin film electronics in the exemplary AM-EWOD device of FIG. 3.

FIG. 6 is a drawing depicting an exemplary arrangement of thin film electronics 46 in the exemplary AM-EWOD device 36 of FIG. 3. The thin film electronics 46 is located upon the lower substrate 44. Each array element 51 of the array of elements 50 contains an array element circuit 72 for controlling the electrode potential of a corresponding element electrode 48. Integrated row driver 74 and column driver 76 circuits are also implemented in thin film electronics 46 to supply control signals to the array element circuit 72. The array element circuit 72 may also contain a sensing capability for detecting the presence or absence of a liquid droplet in the location of the array element. Integrated sensor row addressing 78 and column detection circuits 80 may further be implemented in thin film electronics for the addressing and readout of the sensor circuitry in each array element.

A serial interface 82 may also be provided to process a serial input data stream and facilitate the programming of the required voltages to the element electrodes 48 in the array 50. A voltage supply interface 84 provides the corresponding supply voltages, top substrate drive voltages, and other requisite voltage inputs as further described herein. A number of connecting wires 86 between the lower substrate 44 and external control electronics, power supplies and any other components can be made relatively few, even for large array sizes. Optionally, the serial data input may be partially parallelized. For example, if two data input lines are used the first may supply data for columns 1 to X/2, and the second for columns (1+X/2) to M with minor modifications to the column driver circuits 76. In this way the rate at which data can be programmed to the array is increased, which is a standard technique used in Liquid Crystal Display driving circuitry.

Generally, an exemplary AM-EWOD device 36 that includes thin film electronics 46 may be configured as follows. The AM-EWOD device 36 includes the reference electrode 58 mentioned above (which, optionally, could be an in-plane reference electrode) and a plurality of individual array elements 51 on the array of elements 50, each array element 51 including an array element electrode 48 and array element circuitry 72. Relatedly, the AM-EWOD device 36 may be configured to perform a method of actuating the array elements to manipulate liquid droplets on the array by controlling an electrowetting voltage to be applied to a plurality of array elements. The applied voltages may be provided by operation of the control system described as to FIG. 2, including the control electronics 38 and applications and data stored on the storage device 40. The electro-wetting voltage at each array element 51 is defined by a potential difference between the array element electrode 48 and the reference electrode 58. The method of controlling the electro-wetting voltage at a given array element typically includes the steps of supplying a voltage to the array element electrode 48, and supplying a voltage to the reference electrode 58, by operation of the control system.

Figure 7:
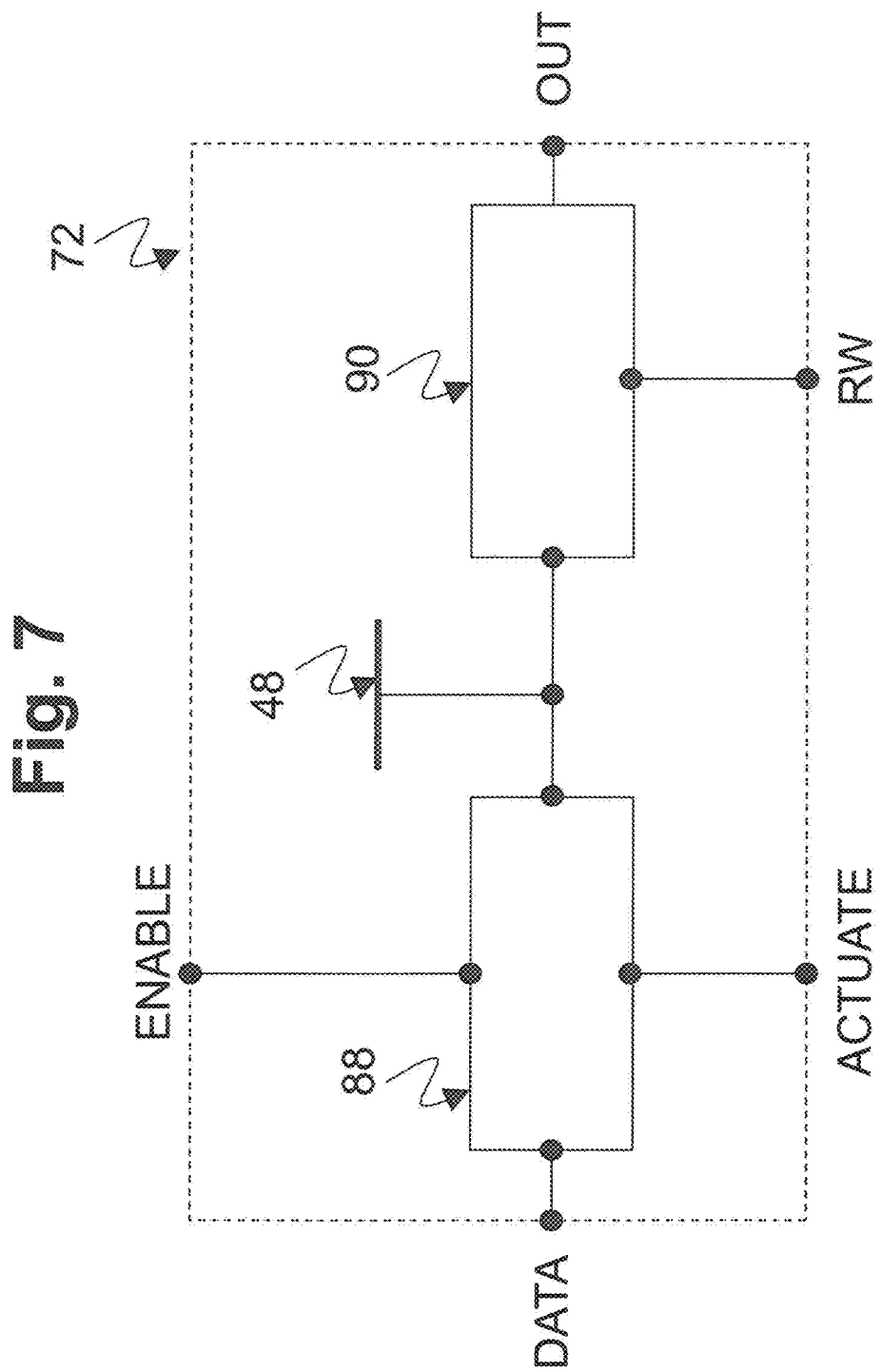
FIG. 7 is a drawing depicting an exemplary arrangement of the array element circuitry of an array element.

FIG. 7 is a drawing depicting an exemplary arrangement of the array element circuit 72 present in each array element 51. The array element circuit 72 may contain an actuation circuit 88, having inputs ENABLE, DATA and ACTUATE, and an output which is connected to an element electrode 48. The array element circuit 72 also may contain a droplet sensing circuit 90, which may be in electrical communication with the element electrode 48. Typically, the readout of the droplet sensing circuit 90 may be controlled by one or more addressing lines (e.g. RW) that may be common to elements in the same row of the array, and may also have one or more outputs, e.g. OUT, which may be common to all elements in the same column of the array.

The array element circuit 72 may typically perform the functions of:
(i) Selectively actuating the element electrode 48 by supplying a voltage to the array element electrode. Accordingly, any liquid droplet present at the array element 51 may be actuated or de-actuated by the electrowetting effect.
(ii) Sensing the presence or absence of a liquid droplet at the location of the array element 51. The means of sensing may be capacitive, optical, thermal or some other means. Capacitive sensing may be employed conveniently and effectively using an impedance sensor circuit as part of the array element circuitry.

Exemplary configurations of array element circuits 72 including impedance or capacitance sensor circuitry are known in the art, and for example are described in detail in commonly assigned U.S. Pat. No. 8,653,832 (Hadwen et al., issued Feb. 18, 2014), and commonly assigned UK application GB1500261.1, both of which are incorporated here by reference. These patent documents include descriptions of how the droplet may be actuated by means of electrowetting, and how the droplet may be sensed by capacitive or impedance sensing means. Typically, capacitive and impedance sensing may be analogue and may be performed simultaneously, or near simultaneously, at every element in the array. By processing the returned information from such a sensor (for example in the application software in the storage device 40 of the reader 32), the control system described above can determine in real-time, or almost real-time the position, size, centroid and perimeter of each liquid droplet present in the array of elements 50. As referenced in connection with FIG. 2, an alternative to sensor circuitry is to provide an external sensor (e.g., sensor 35), such as an optical sensor that can be used to sense droplet properties.

With the device configurations, a droplet operation may be performed using a time-series of sequential actuation patterns written to the electrowetting array to perform a desired droplet manipulation operation. Examples of basic droplet operations having associated droplet manipulation responses include moving droplets, merging multiple droplets, splitting a droplet, dispensing a droplet from a larger liquid reservoir, mixing multiple droplets, and others. More complex droplet operations may incorporate combinations of basic operations so as to dilute, wash, elute and the like. An actuation pattern is defined as a pattern of data written to the electrowetting device array, typically digital (though could in principle be analogue) and comprising array elements written "1" for electrowetting actuation and "0" for no actuation. During an actuation or "1" state, a surface of a given array element corresponds to the surface being controlled to be hydrophilic for the electrowetting effect, and during the non-actuation or "0" state a surface of a given array element corresponds to the surface being controlled to be hydrophobic. Method of applying various actuating patterns to an AM-EWOD are known, as described for example in Applicant's commonly owned application Ser. No. 15/475,410 filed on May 31, 2017.

In accordance with embodiments of the present disclosure, test measurements are performed to measure a droplet response to an exemplary actuation pattern. In a response to application of an actuation pattern, physical properties of a liquid or liquid droplet may be measured, including for example movement speed, electrowetting strength as indicated by the ability of the droplet contact line to deform into a curved shape under electrowetting actuation, conductivity, contact angle, and viscosity. Actuation patterns may be chosen from a library of actuation patterns that are designed to measure each desired physical property, and each actuation pattern may differ in actuation voltage magnitude, actuation voltage AC frequency, and operating temperature. The measured response of a droplet to the actuation pattern constitutes an automated test measurement, and the response may be measured using any suitable sensor technology to measure a droplet footprint in response to electrowetting actuation. Suitable sensing technology may include sensor circuitry integrated into the AM-EWDO device such as capacitance or impedance sensing, or external sensing such as by optical image sensing using a CCD camera or like device. As further detailed below, the results of the test measurements provide metrics for optimizing subsequent droplet manipulation operations.

To perform the test measurements, an actuation pattern is applied to a droplet. The actuation pattern may have a different shape, different dimensions, a concavity and/or the like as compared to the droplet when the actuation pattern is not applied. The conformance level of a droplet to the actuation pattern, and/or a transition rate from the non-actuated state or other previous state, will vary dependently on the actuation potential and frequency of the applied actuation voltage, a physical property of the liquid, and/or the environmental conditions of operation. A sensor measurement is taken once the droplet has reached a static or equilibrium state. The conformance of the liquid droplet to the actuation pattern, and/or a time response to transition to the equilibrium state, is measured and recorded as a metric describing the response of the droplet to the electrowetting actuation voltage. The metric is then used to devise an optimum droplet manipulation operation algorithm. The droplet manipulation operation algorithm may be calculated by the system or selected from a pre-defined library of droplet manipulation operations stored in the system memory.

Differences between the variants of droplet operation encoded in the calculation parameters or stored library may include for example:

(a) variants in the constant-rate electrowetting actuation sequences;
(b) variations in the time between frames of the electrowetting actuation sequence;
(c) variations in a scheme of adaptive electrowetting patterns, e.g., the actuation pattern itself is selected depending upon the droplet response, whereby the pattern is chosen in response the sensor measurement;
(d) variations in the electrowetting actuation voltage magnitude or voltage AC operating frequency; and
(e) variations in the temperature of the device, for example the system may be heated to make the desired droplet manipulation easier to perform.

Embodiments of the present disclosure are advantageous over conventional configurations by performing a test measurement and optimizing the subsequent droplet manipulation operation, and thus device performance, such as operation reproducibility, speed of execution, and reliability are improved. The enhanced performance is significant because the optimum droplet operation may be very dependent on the characteristics of the liquid and on the environmental conditions, which may be variable in the field. For example, a liquid which does not conform well will require a droplet operation that has simpler actuation patterns than a liquid that does conform well. Reagents from different batches, or user added samples, may have different physical characteristics which need different operations to perform the same action. Alternatively, environmental characteristics, e.g. temperature of the user's laboratory, may vary significantly, especially if the device is being used at a particular point of need which may not be an optimum setting. The described systems and methods implement such optimization in a fully automated way, so that the user need take no action (or even necessarily need to be aware such optimization is required and has been implemented).

An aspect of the invention, therefore, is a control method for controlling actuation voltages applied to array elements of an element array on an electrowetting on dielectric (EWOD) device, wherein test metrics are determined and employed for optimizing subsequent droplet manipulation operations. In exemplary embodiments, the control method includes the steps of: receiving a liquid droplet onto the element array; applying an electrowetting actuation pattern of actuation voltages to actuate the droplet to modify a footprint of the droplet from a first state having an initial footprint to a second state having a modified footprint; sensing the modified footprint with a sensor; determining a test metric from sensing the modified footprint indicative of one or more droplet properties based on a droplet response of the liquid droplet to the electrowetting actuation pattern; and controlling actuation voltages applied to the array elements based on the test metric. In the context of this disclosure, a footprint or footprint area of the droplet can be understood to be the contact area of the droplet with either the lower or upper substrate, typically the lower substrate including the patterned electrode array. More specific features or steps of such generalized operation are described with respect to the additional figures.

FIGS. 8A-8C are drawings depicting an exemplary embodiment of measuring a droplet response to an actuation pattern that is suitable for measuring a droplet time response metric. In these examples, a first actuation pattern is applied until the droplet reaches a first stable state in which the droplet has an initial footprint, with a footprint corresponding to a shape and location of the centroid of the liquid droplet. Once the first stable state is reached, a second actuation pattern is applied to alter the droplet into a second stable state having a modified footprint that is different from the initial footprint. Time is recorded for the droplet to transition from the first stable state to the second stable state. In these figures, the hashed portion represents the droplet as configured in the first stable state of the first actuation pattern (denoted the Start Droplet 100*x*), and the shaded portion represents the droplet as configured in the second stable state of the second actuation pattern (denoted the End Droplet 102*x*). The rate of the droplet transition between stable states is used as a metric for detecting differences between liquids of different characteristics and/or subject to different environmental conditions to determine a selection of a droplet manipulation operation.

In the example of FIG. 8A, the transition from the first stable state to the second stable state constitutes a change in droplet shape while maintaining a centroid (i.e., center of mass) of the droplet. For example, the start droplet 100*a* is actuated using a square actuation pattern resulting in a square shape as the first stable state, and the transition is achieved by applying a rectangular actuation pattern resulting in end droplet 102*a* for the second stable state, i.e., the droplet shape is different in the second state relative to the first state. A centroid 104*a* of the droplet is the same in both the first and second states, i.e., the centroid remains at a constant location during the transition. In the example of FIG. 8B, the transition from the first stable state to the second stable state constitutes a change in the droplet centroid location while maintaining the same droplet shape in the first and second states. This may be performed by using a time-sequence of actuation patterns that progressively relocates the centroid of the droplet. For example, the start droplet 100*b* again is actuated using a square actuation pattern, and the transition is achieved by applying a square actuation pattern progressively in adjacent locations to move the droplet resulting in end droplet 102*b* having a different centroid location 104*b* in the second stable state. In the example of FIG. 8C, the two transitions are combined in a single operation. The transition from the first stable state to the second stable state constitutes a change in the droplet shape and the droplet centroid location. For example, the start droplet 100c again is actuated using a square action pattern and corresponding to a first centroid location 104a, and the transition is achieved by applying a rectangular actuation pattern in progressively different locations resulting in end droplet 102c having a rectangular shape and a different centroid location 104c in the second stable state.

In each example, a rate of the transition from the first stable state to the second stable state is measured, and using the rate of transition provides a metric for detecting differences between liquids of different characteristics to select suitable droplet manipulation operations. In addition, the transition measurements may include measuring the time to achieve the first stable state at the outset, as well as transitioning from the first stable state to the second stable state. The transitions further may be repeated for multiple different electrowetting voltage magnitudes, with the transition time being measured at each voltage magnitude. The transitions further may be repeated for multiple different electrowetting voltage AC frequencies, with the transition time being measured at each AC frequency. The transitions further may be repeated at different temperatures, achieved by heating the EWOD device and applying the actuation pattern at a plurality of temperatures. The transition rate test metric then may be determined based on a droplet response of the droplet at the different electrowetting voltage magnitudes, electrowetting voltage AC frequencies, and/or temperatures.

For example, FIG. 9 is a drawing depicting a relationship of transition rate versus electrowetting voltage magnitude, for an example transition of movement of a droplet of a given shape as depicted in FIG. 8B. Accordingly, the speed of movement is plotted against the electrowetting voltage magnitude. As seen in this figure, the electrowetting voltage magnitude is increased until the break point 106, which corresponds to a minimum actuation voltage for effective droplet movement. The movement speed increases with voltage magnitude until a plateau is reached at the break point 108.

Figure 10:
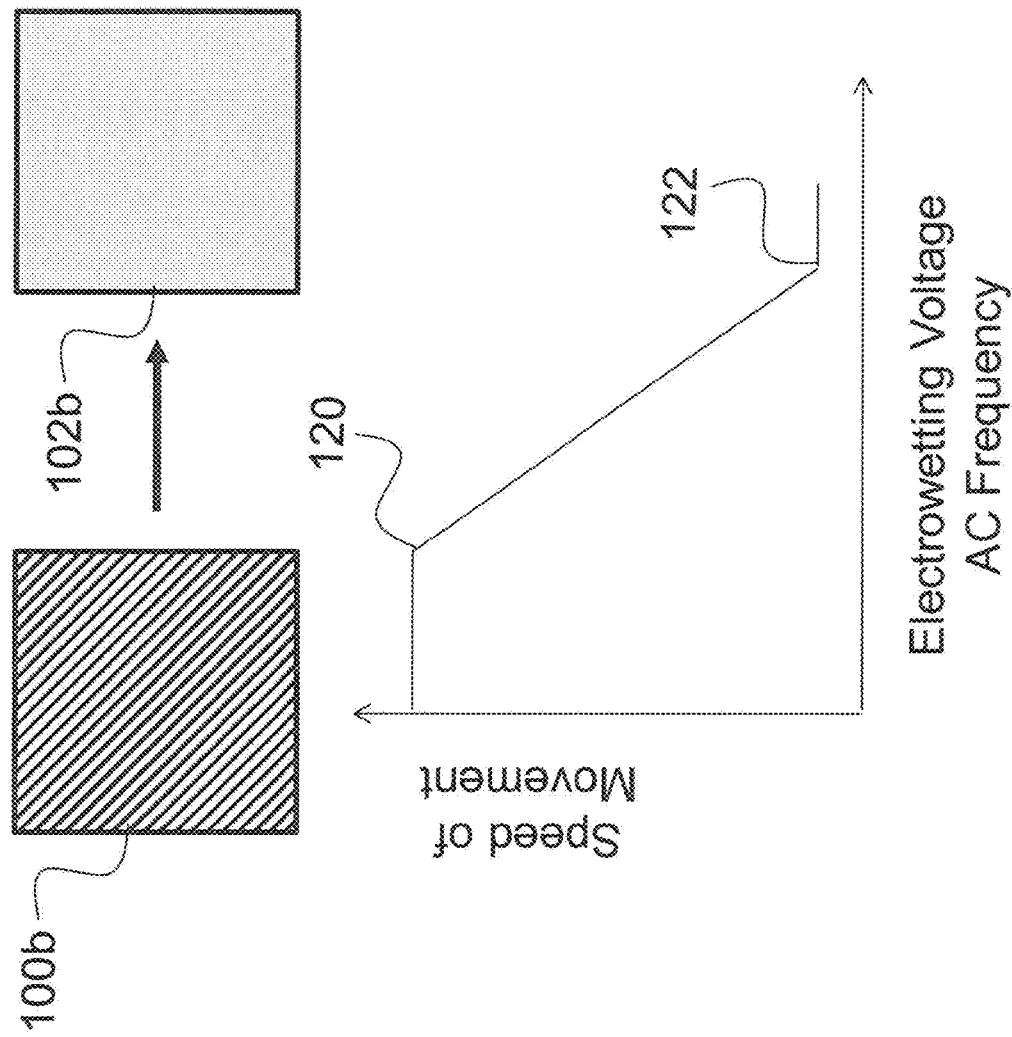
FIG. 10 is a drawing depicting a relationship of transition rate versus electrowetting voltage AC frequency, for an example transition of movement of a droplet of a given shape.

As another example, FIG. 10 is a drawing depicting a relationship of transition rate versus electrowetting voltage AC frequency, again for an example transition of movement of a droplet of a given shape as depicted in FIG. 8B. Accordingly, the speed of movement is plotted against the AC frequency. As seen in this figure, movement speed decreases with frequency from a plateau at break point 120 down to break point 122 corresponding to a maximum AC frequency at which a droplet can be moved effectively.

FIGS. 11A-11C are drawings depicting an exemplary embodiment of measuring a droplet response to an actuation pattern that is suitable for measuring droplet conformance with a particularly shaped actuation pattern. In these examples, an actuation pattern is applied to alter the droplet shape from a native shape of a first non-actuated state (typically ellipsoid) having an initial footprint, to second actuated state of a non-standard shape (non-ellipsoid) having a modified footprint different from the initial footprint. Again, in the context of this disclosure, a footprint or footprint area of the droplet can be understood to be the contact area of the droplet with either the lower or upper substrate, typically the lower substrate including the patterned electrode array. In addition, when droplet conformance is the appropriate metric, the actuation pattern has a footprint area similar to or greater than the footprint area of the droplet. More specific features or steps of such generalized operation are described with respect to the additional figures.

In these figures, the hashed portion represents the actuation pattern 124 that is overlaid on the shaded portion corresponding to the actual droplet 126 as shaped in response to the actuation pattern. For example, in FIG. 11A, the droplet is formed with the actuation pattern being essentially a tear-drop shape with a wedge cut-out 128 using a stopper or like structure, as the non-standard shape. The degree of conformance of the droplet contact line of the second footprint to the actuation pattern in the second state is used as a metric for detecting differences between liquids of different characteristics and/or subject to different environmental conditions to determine a selection of a droplet manipulation operation.

It has been found by the inventors that an actuation pattern including two or more concavities has been shown to be particularly suitable for measuring a droplet conformance metric for detecting differences between liquids of different characteristics and/or different environmental conditions. Such an example is shown in FIG. 11B, in which the actuation pattern is cross-shaped to form four concavities 130 where the cross portions centrally meet. As another example, FIG. 11C depicts an actuation pattern that is a divided actuation pattern split into a first actuation portion 132 that is spaced apart from a second actuation portion 134. A degree of conformance with the divided actuation pattern also can be used as a metric for detecting differences between liquids of different characteristics and/or subject to different environmental conditions.

In each example, a degree of conformance of the droplet contact line with the actuation pattern is measured, and using such degree of conformance provides another metric for detecting differences between liquids of different characteristics and/or subject to different environmental conditions to select suitable droplet manipulation operations. Similarly as with measuring transition rates above, the conformance measurements may be repeated for multiple different electrowetting voltage magnitudes, with the degree of conformance being measured at each voltage. The conformance measurement further may be repeated for multiple different electrowetting voltage AC frequencies, with the degree of conformance being measured at each AC frequency. The conformance measurements further may be repeated at different temperatures, achieved by heating the EWOD device and applying the actuation pattern at a plurality of temperatures. The degree of conformance test metric then may be determined based on a droplet response of the droplet at the different electrowetting voltage magnitudes, electrowetting voltage AC frequencies, and/or temperatures.

Accordingly, FIG. 12 depicts different degrees of conformance as measured against the actuation patterns of FIGS. 11A-11C. In particular, Column A corresponds to a low degree of conformance, Column B corresponds to a medium degree of conformance, and Column C corresponds to a high degree of conformance. As referenced above, the degree may conformance may vary with actuation voltage magnitude, AC frequency, or temperature.

Figure 13:
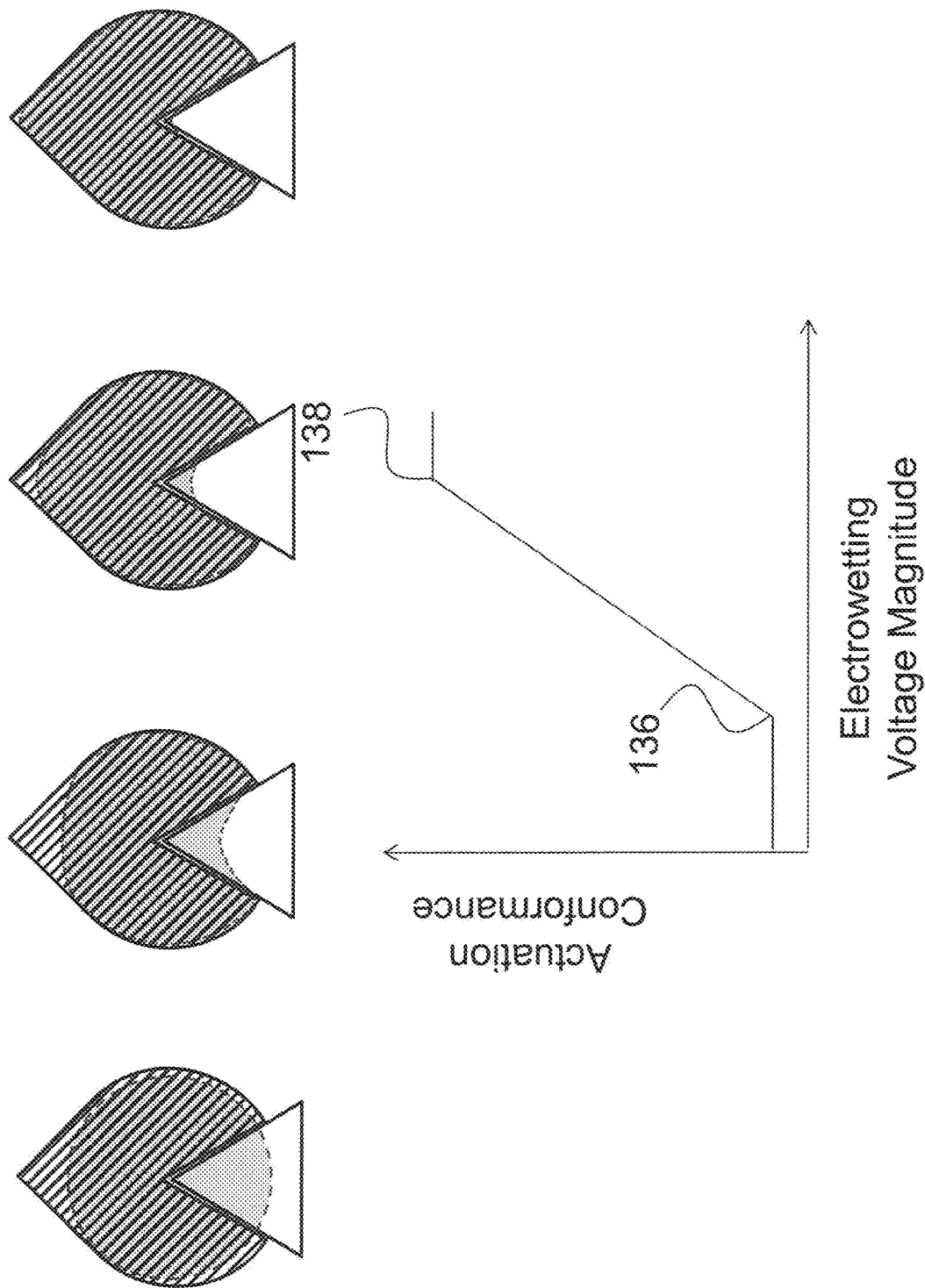
FIG. 13 is a drawing depicting a relationship of actuation conformance versus electrowetting voltage magnitude, for an example shaped actuation pattern as depicted in FIG. 11A.

For example, FIG. 13 is a drawing depicting a relationship of actuation conformance versus electrowetting voltage magnitude, for an example shaped actuation pattern as depicted in FIG. 11A. Accordingly, the actuation conformance is plotted against the electrowetting voltage magnitude, with corresponding conformance progression depicted above the graph. As seen in this figure, the electrowetting voltage magnitude increases until the break point 136, which corresponds to a minimum actuation voltage for effective droplet shape change. The degree of conformance increases until a plateau is reached at the break point 138 indicating maximum conformance. In this manner, the relationship between degree of conformance and actuation voltage magnitude is comparable to the relationship between transition rate and actuation voltage magnitude as illustrated in FIG. 9.

The strength of the electrowetting force, and corresponding conformance of the droplet contact line to the actuation pattern, is described by the known Lippmann-Young equation relating the contact angle to actuation voltage. The strength of electrowetting actuation is described by the ratio of the voltage squared to the surface tension at the interface between the liquid droplet and the surrounding media (typically oil). The surface tension may vary according to the constitution of the droplet or of the oil, particularly in relation to the constitution and concentration of any surfactant species present in either media. Typically, one or more surfactants is included to lower the surface tension. The surface tension may also depend on environmental variables, such as the operating temperature in particular.

According to this embodiment, the conformance to the actuation pattern is measured for the multiple voltage magnitudes, and an optimized actuation voltage magnitude is determined according to the results. In addition to selecting the actuation voltage magnitude to be large enough to ensure suitable conformance, there is also a motivation to make the actuation voltage magnitude not too large. Operating with an overly-large actuation voltage magnitude may reduce the reliability of droplet manipulation, in that applying excess energy to the droplet contact line may destabilize the contact line. Also, operation with a larger than required actuation voltage magnitude may compromise the reliability of the device itself, for example by applying a higher than needed electric field through the insulator and hydrophobic coating layers. A higher than necessary actuation voltage magnitude also consumes power unnecessarily. This balance between the positive and detrimental effects of a larger actuation voltage magnitude also is applicable to voltage selection with respect to optimization for transition rates (movement speed) as described in connection with FIG. 9.

Figure 14:
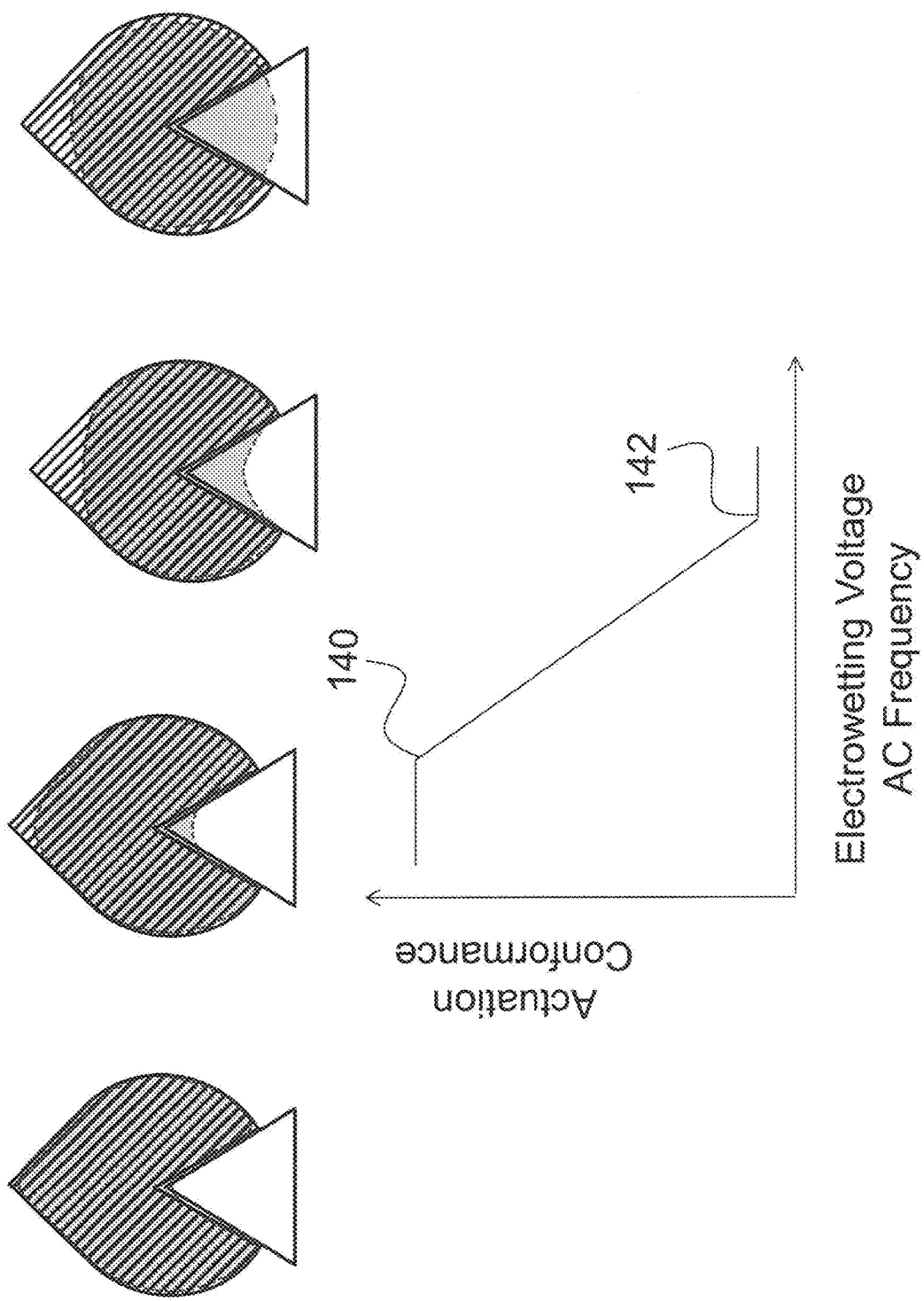
FIG. 14 is a drawing depicting a relationship of actuation conformance versus electrowetting voltage AC frequency, again for an example shaped actuation pattern as depicted in FIG. 11A.

As another example, FIG. 14 is a drawing depicting a relationship of actuation conformance versus electrowetting voltage AC frequency, again for an example shaped actuation pattern as depicted in FIG. 11A. Accordingly, the degree of conformance is plotted against the AC frequency, with corresponding conformance progression depicted above the graph. As seen in this figure, the degree of conformance decreases with frequency from a plateau at break point 140 down to break point 142 corresponding to a maximum AC frequency for effectively achieving a droplet shape change. In this manner, the relationship between degree of conformance and actuation voltage AC frequency is comparable to the relationship between transition rate and AC frequency as illustrated in FIG. 10. The frequency response of the conformance to the actuation pattern is a function of droplet conductivity. For example, if the ionic concentration of the droplet is less than 1 uM, a reduction in conformance will be evident at an AC frequency of less than 1 kHz. Similarly, if the ionic concentration is around 10 uM, the critical AC frequency will be around 10 kHz, and if around 100 uM the critical frequency will be around 100 kHz.

FIGS. 8-14, therefore, illustrate how test metrics can aid the selection of parameters of subsequent droplet manipulation operations. For example, test measurements performed in accordance with the above show, for the applicable liquid, what levels of electrowetting voltage magnitude and AC frequency would be optimal to achieve a desired transition rate or conformance for any given droplet manipulation operation to be performed. In this manner, device performance is improved. Similar test measurements may be performed as to other droplet properties and environmental conditions to determine comparable metrics.

Figure 15:
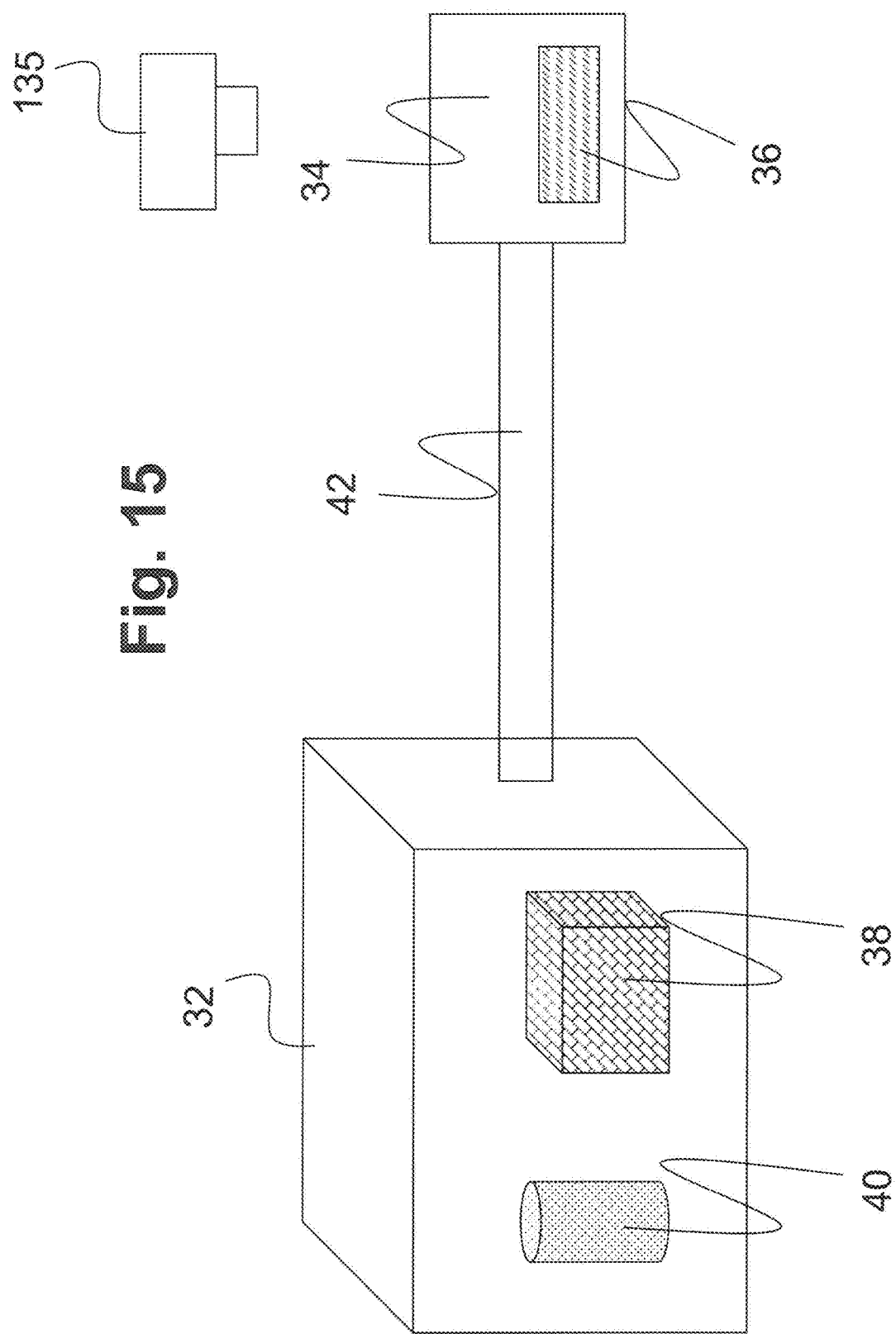
FIG. 15 is a drawing depicting a variation on the EWOD based microfluidic system of FIG. 2, in which the external sensor is an optical sensor placed above the device.

Upon application of actuation patterns according to any of the embodiments, droplet response may be measured in any suitable manner. For example, an integrated sensor such as the impedance/capacitor sensor circuit 90 (FIG. 7) may be used to determine droplet properties including a droplet footprint. Additionally or alternatively, an external optical sensor, such as a CCD camera may be used to measure droplet properties including a droplet footprint. For example, FIG. 15 is a drawing depicting a variation on the AM-EWOD microfluidic system of FIG. 2, in which the external sensor is an optical sensor 135 placed above (or below) the device. As an addition or alternative, FIG. 16 is a drawing depicting a variation on the AM-EWOD microfluidic system of FIG. 15, in which the optical sensor 135 is mounted to the side of the device to measure a side profile of the droplet. An example optical measurement that is taken from the side and recorded as a metric is the contact angle 66 of the droplet 52 on the hydrophobic surface 64 (see also FIG. 4). As another example, referring back to FIGS. 5A and 5B, a sensor measurement may be made to determine the voltage drop across the droplet 52 compared to the voltage drop across an electrowetting element without a droplet (the non-polar fluid 60 being modeled as a capacitor) to measure the conductivity of the liquid. All such measurements, including for example the droplet footprint, contact angle, conductivity, and the like may be employed for determining the droplet response metrics for detecting differences between liquids of different characteristics and/or subject to different environmental conditions to select suitable droplet manipulation operations.

The results of the test measurements described in the above embodiments may be used in a subsequent, automated selection of droplet manipulation operations to be performed by the AM-EWOD device. In this manner, the test measurements provide feedback results to detect the specific characteristics of the liquids from which additional droplets are to be dispensed, in view of liquid constituents and environmental conditions that can affect how droplets will respond to actuation of the array elements. Accordingly, control methods include controlling actuation voltages applied to the array elements based on the test metric(s) by: determining a droplet manipulation operation based on the test metric(s); and controlling the actuation voltages to perform the determined droplet manipulation operation on one or more droplets that are dispensed onto the element array.

The feedback results provided by previous test measurements may be used in a variety of ways. For example, the feedback results may determine a selection of an analogue value of a manipulation parameter, for example actuation voltage AC frequency or actuation voltage magnitude. The values may be implemented by simple proportionality based on droplet response in the test measurements, or by calculation according to a pre-defined equation implemented in software, such as for example a look-up polynomial.

An additional method of utilizing the feedback results is to select a droplet manipulation operation as a choice from two or more options, according to the results of the test measurements. For example, if a test measurement quantity is "x" a droplet manipulation operation may have multiple options, three options in this specific example: Operation A, Operation B, and Operation C. Any suitable number of options may be available. The appropriate droplet manipulation operation may be chosen from a comparison of the measured value "x" from the test measurements with one or more pre-programmed threshold values, two pre-programmed threshold values "a" and "b" in this example, with the resultant selection of the operation being illustrated by the following table. Similarly as above, any suitable number of pre-programmed threshold values may be employed.

| | |
|---|---|
| x < a | Choose Operation A |
| a < x < b | Choose Operation B |
| b < x | Choose Operation C |

For the present example, in general, the measured value "x" may relate to one or more of the test metrics referenced above corresponding to a droplet response to an applied actuation pattern. For example, the value of "x" may be a transition rate, such as a movement speed or transition rate from a first stable state to a second stable state, or may be a degree of conformance with an actuation pattern or patterns. The measurements to obtain the metrics may be made at multiple actuation voltage magnitudes, AC frequencies, and/or temperature as described above, with the droplet responses measured and stored by the device control system. The different pre-defined Operations A, B, and C may correspond to different potential selections of actuation patterns for performing a droplet manipulation operation, with each actuation pattern corresponding to a sequence of array elements to be actuated, as well as actuation voltage parameters such as magnitude and AC frequency. Thus for the present example, if the measured value "x" is less than the pre-programmed threshold value "a", Operation A is selected; if the measured value "x" is between the pre-programmed threshold values "a" and "b", Operation B is selected; and if the measured value "x" is greater than the pre-programmed threshold value "b", Operation C is selected. Multiple test metrics and pre-programmed threshold values can be grouped and analyzed for selection of the most optimum droplet manipulation operation.

In a generalized illustration, a viscous more conductive liquid droplet at a relatively low temperature will have a different response metric or metrics as compared to a less viscous and less conductive liquid droplet at a relatively high temperature. In terms of system operation, the measured "x" values will be different, which may result in a different selection of droplet manipulation operation by calculation or by selection from among pre-defined operations in a look-up table. Even liquids generally deemed the "same" may vary within tolerances, and the environmental conditions may differ, so the system can select optimum operational actuation patterns for performing a given droplet manipulation operation.

An example of this operation may be in the choice of a droplet manipulation operation including a pattern of actuation sequences for dispensing a droplet from a larger liquid reservoir. An exemplary test metric may be a degree of conformance determined using the measurements described in accordance with FIGS. 11-14. According to the droplet response metrics from the results of the conformance measurements, a sequence of actuation patterns for dispensing a droplet may be calculated or selected from among multiple pre-defined operations stored in a look-up table to perform the dispense operation in a manner that requires less or more conformance of the droplet to the actuation pattern to execute the dispensing operation successfully. For example, a dispense Operation A may require a high conformance to the actuation pattern to execute reliably, but assuming this to be the case, the volume reproducibility of the dispensed droplet may be very high. By contrast, Operation C may execute more reliably than Operation A under conditions in which the droplet conformity to the actuation pattern is lesser. The improved reliability for poorly actuating liquids may make Operation C a preferred dispense droplet operation, even if it takes longer to execute or has a lower volume reproducibility than Operation A.

The above principles may be applied as to any suitable droplet manipulation operation. Examples include using metrics to determine or select from a pre-defined library a droplet operation algorithm to split a droplet into two or more droplets, to merge multiple droplets, to agitate a droplet to mix the droplet, to hold a droplet in place, to move a droplet to another location on the element array, or others. More complex droplet manipulation operations may incorporate combinations of these basic operations so as to dilute, wash, elute and the like. In addition, many of the examples have been described with respect to selection of alternative droplet manipulation operations from a pre-defined library stored in the system, but this need not be the case. Alternatively, the droplet operations can be determined by calculation performed by the system without reference to any pre-defined library. Such method has an advantage in that for some types of liquids a droplet manipulation operation may not need to occur which is needed for other liquids. Additional examples may include using the metrics to change an order of two or more droplet operations.

In another example, the metrics are used to determine whether a fault condition is present corresponding to the liquid droplets not actuating, which can include informing the user with an error message outputted by the EWOD device. FIG. 17 is a graphical drawing depicting an algorithm for determining a fault condition. In this example, speed of movement is plotted against actuation conformance as test metrics. A first region 150 in the graph, denoted the "Pass Region", represents combinations of movement speed and actuation conformance that are suitable for performing the desired droplet manipulation operation(s). In contrast, a second region 152 in the graph, denoted the "Fail Region", represents combinations of movement speed and actuation conformance that are not suitable for performing the desired droplet manipulation operation(s). If the test metrics for the droplet response fall within the Fail Region 152, an error message may be outputted by the system to inform the user. In some circumstances, it may be possible to diagnose the cause of the fault, for example a particular liquid is out of specification, and prompt the user to take corrective action, for example remove the cartridge and start again with a fresh cartridge and liquid that is within specification. This fault system is advantageous in allowing the droplet manipulation operation sequence to be stopped if the reagents do not behave in a suitable way under the corresponding environmental conditions. Although movement speed and degree of conformance are metrics used in this example, more generally the determination of a fault condition may include determining whether any combination metrics of the droplet is suitable versus unsuitable for performing a desired droplet manipulation operation.

The system is also fully automated. In exemplary embodiments, the control system may execute any number of test measurement protocols as executable program code as part of the control application, which may be stored in the storage device 40 and executed by processor devices of the control electronics 38 (see FIGS. 2, 16 and 17). The control system further may receive droplet response measurements based on sensor measurements, and determine the resultant test metrics, which likewise may be stored in the system storage device. Using such test metrics, the control system further may perform the requisite calculations and/or selection from a stored look-up table of a particular operational actuation pattern (or patterns) for performing a droplet manipulation operation. In this manner, a device user may simply initiate any desired operational protocol, which may include one or a series of droplet manipulation operations, by user selection through interface devices of the control electronics, or otherwise selected automatically as part of the control application. The AM-EWOD system can then automatically perform any suitable test operations and proceed to determination and selection of the optimal droplet manipulation operations without further additional input from the user.

Embodiments of the present disclosure are advantageous over conventional configurations by performing a test protocol and optimizing a subsequent droplet manipulation operation based on metrics corresponding to the droplet response to an actuation pattern applied during the test protocol. This improves device performance, including operation reproducibility, speed of execution, and reliability. The described methods, therefore, account for differences in droplet response that may vary depending on the characteristics of the liquid and/or on the environmental conditions, which may be variable in the field, to optimize droplet manipulation operations. The described systems and methods implement such optimization in a fully automated way, so that the user need take no action (or even necessarily need to be aware such optimization is required and has been implemented).

An aspect of the invention, therefore, is a control method for controlling actuation voltages applied to array elements of an element array on an electrowetting on dielectric (EWOD) device, wherein test metrics are determined and employed for optimizing subsequent droplet manipulation operations. In exemplary embodiments, the control method includes the steps of: receiving a liquid droplet onto the element array; applying an electrowetting actuation pattern of actuation voltages to actuate the droplet to modify a footprint of the droplet from a first state having an initial footprint to a second state having a modified footprint; sensing the modified footprint with a sensor; determining a test metric from sensing the modified footprint indicative of one or more droplet properties based on a droplet response of the liquid droplet to the electrowetting actuation pattern; and controlling actuation voltages applied to the array elements based on the test metric. The control method may include one or more of the following features, either individually or in combination.

In an exemplary embodiment of the control method, the test metric includes a transition rate from the first state to the second state.

In an exemplary embodiment of the control method, the droplet has a first shape in the first state and a second shape different from the first shape in the second state, and the droplet has the same centroid in the first state and the second state.

In an exemplary embodiment of the control method, the droplet has a first centroid in the first state and a second centroid different from the first centroid in the second state, and the droplet has the same shape in the first state and the second state.

In an exemplary embodiment of the control method, the droplet has a first shape in the first state and a second shape different from the first shape in the second state, and the droplet has a first centroid in the first state and a second centroid different from the first centroid in the second state.

In an exemplary embodiment of the control method, the test metric includes a degree of conformance of the droplet with an electrowetting actuation pattern with one concavity.

In an exemplary embodiment of the control method, the electrowetting actuation pattern includes two or more concavities.

In an exemplary embodiment of the control method, the electrowetting actuation pattern is a divided actuation pattern spit into a first actuation portion spaced apart from a second actuation portion.

In an exemplary embodiment of the control method, the test metric includes a measurement of voltage dropped across the droplet.

In an exemplary embodiment of the control method, the electrowetting actuation pattern is applied at a plurality of electrowetting voltage magnitudes, and the test metric is determined based on a droplet response of the droplet at the different electrowetting voltage magnitudes.

In an exemplary embodiment of the control method, the actuation pattern is applied at a plurality of electrowetting voltage AC frequencies, and the test metric is determined based on a droplet response of the droplet at the different electrowetting voltage AC frequencies.

In an exemplary embodiment of the control method, the method further includes changing the temperature of the EWOD device and applying the actuation pattern at a plurality of temperatures, and the test metric is determined based on a droplet response of the droplet at the different temperatures.

In an exemplary embodiment of the control method, controlling actuation voltages applied to the array elements based on the test metric comprises: determining a droplet manipulation operation based on the test metric; and controlling the actuation voltages to perform the determined droplet manipulation operation on one or more droplets that are dispensed onto the element array.

In an exemplary embodiment of the control method, determining a droplet manipulation operation based on the test metric comprises comparing the test metric to a threshold value, and selecting the droplet manipulation operation from among pre-defined options stored in a memory based on the comparison.

In an exemplary embodiment of the control method, the droplet manipulation operation includes dispensing one or more droplets onto the element array from a liquid reservoir, and at least one of splitting a droplet into two or more droplets, merging multiple droplets, agitating a droplet to mix the droplet, holding a droplet in place, or moving a droplet to another location on the element array.

In an exemplary embodiment of the control method, controlling actuation voltages applied to the array elements based on the test metric comprises: determining whether a fault condition is present corresponding to a droplet not actuating; and outputting an error message from the EWOD device to inform a user when a fault condition is present.

In an exemplary embodiment of the control method, determining whether a fault condition is present comprises determining whether a combination of metrics of the droplet is suitable or unsuitable for performing a desired droplet manipulation operation.

Another aspect of the invention is a microfluidic system including: an electrowetting on dielectric (EWOD) device including an element array configured to receive one or more liquid droplets, the element array comprising a plurality of individual array elements; a control system configured to control actuation voltages applied to the element array to perform manipulation operations as to the liquid droplets; and a sensor for sensing a state of the liquid droplets. The control system is configured to perform the steps of the control method according to any of the embodiments. In exemplary embodiments, the sensor is an optical sensor external from the EWOD device and/or sensor circuitry integrated into array element circuitry of each of the individual array elements. The control methods may be performed by the control system executing program code stored on a non-transitory computer readable medium.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The described embodiments could be used to provide an enhanced AM-EWOD device. The AM-EWOD device could form a part of a lab-on-a-chip system. Such devices could be used in manipulating, reacting and sensing chemical, biochemical or physiological materials. Applications include healthcare diagnostic testing, material testing, chemical or biochemical material synthesis, proteomics, tools for research in life sciences and forensic science.

REFERENCE SIGNS LIST

10—lower substrate
12—array element electrodes
12A—array element electrode
12B—array element electrode
14—liquid droplet
16—top substrate
18—spacer
20—non-polar fluid
22—insulator layer
24—first hydrophobic coating
26—contact angle
28—second hydrophobic coating
30—reference electrode
32—reader
34—cartridge
35—external sensor module
36—AM-EWOD device
38—control electronics
40—storage device
42—connecting wires
44—lower substrate
46—thin film electronics
48—array element electrodes
48A—array element electrode
48B—array element electrode
50—array of elements
51—array element
52—liquid droplet
54—top substrate
56—spacer
58—reference electrode
60—non-polar fluid
62—insulator layer
64—first hydrophobic coating
66—contact angle
68—second hydrophobic coating
70A—electrical load with droplet present
70B—electrical load with no droplet present
72—array element circuit
74—integrated row driver
76—column driver
78—integrated sensor row addressing
80—column detection circuits
82—serial interface
84—voltage supply interface
86—connecting wires
88—actuation circuit
90—droplet sensing circuit
100a—start droplet
100b—start droplet
100c—start droplet
102a—end droplet
102b—end droplet
102c—end droplet
104a—first centroid location
104b—different centroid location
104c—different centroid location
106—break point
108—break point
120—break point
122—break point
124—actuation pattern
126—droplet
128—wedge cut-out
130—four concavities
132—first actuation portion
134—second actuation portion
135—optical sensor
136—break point
138—break point
140—break point
142—break point
150—first region
152—second region

What is claimed is:

1. A control method for controlling actuation voltages applied to array elements of an element array on an electrowetting on dielectric (EWOD) device, the control method comprising the steps of:
receiving a liquid droplet onto the element array;
applying an electrowetting actuation pattern of the actuation voltages to actuate the droplet to modify a footprint of the droplet, wherein the footprint of the droplet is a defined shape and a location of a centroid of the droplet, from a first state having an initial footprint to a second state having a modified footprint;
sensing the modified footprint with a sensor;
determining a test metric from sensing the modified footprint indicative of one or more droplet properties indicative of a droplet response of the liquid droplet to the electrowetting actuation pattern; and determining an optimum actuation pattern for subsequent droplet manipulations based on the test metric and controlling the actuation voltages applied to the array elements in accordance with the optimum actuation pattern.

2. The control method of claim 1, wherein the test metric includes a transition rate from the first state to the second state.

3. The control method of claim 2, wherein the droplet has a first shape in the first state and a second shape different from the first shape in the second state, and the droplet has the same centroid in the first state and the second state.

4. The control method of claim 2, wherein the droplet has a first centroid in the first state and a second centroid different from the first centroid in the second state, and the droplet has the same shape in the first state and the second state.

5. The control method of claim 2, wherein the droplet has a first shape in the first state and a second shape different from the first shape in the second state, and the droplet has a first centroid in the first state and a second centroid different from the first centroid in the second state.

6. The control method of claim 1, wherein the test metric includes a degree of conformance of the droplet with an electrowetting actuation pattern with one concavity.

7. The control method of claim 6, wherein the electrowetting actuation pattern includes two or more concavities.

8. The control method of claim 6, wherein the electrowetting actuation pattern is a divided actuation pattern spit into a first actuation portion spaced apart from a second actuation portion.

9. The control method of claim 1, wherein the test metric includes a measurement of voltage dropped across the droplet.

10. The control method of claim 1, wherein the electrowetting actuation pattern is applied at a plurality of electrowetting voltage magnitudes, and the test metric is determined based on a droplet response of the droplet at the plurality of electrowetting voltage magnitudes.

11. The control method of claim 1, wherein the electrowetting actuation pattern is applied at a plurality of electrowetting voltage AC frequencies, and the test metric is determined based on a droplet response of the droplet at the plurality of electrowetting voltage AC frequencies.

12. The control method of claim 1, further comprising changing a temperature of the EWOD device and applying the electrowetting actuation pattern at a plurality of temperatures, and the test metric is determined based on a droplet response of the droplet at the plurality of temperatures.

13. The control method of claim 1, wherein controlling the actuation voltages applied to the array elements based on the test metric comprises:
determining a droplet manipulation operation based on the test metric; and
controlling the actuation voltages to perform the determined droplet manipulation operation on one or more droplets that are dispensed onto the element array.

14. The control method of claim 13, wherein determining the droplet manipulation operation based on the test metric comprises comparing the test metric to a threshold value, and selecting the droplet manipulation operation from among predefined options stored in a memory based on the comparison.

15. The control method of claim 13, wherein the droplet manipulation operation includes dispensing the one or more droplets onto the element array from a liquid reservoir, and at least one of splitting a droplet into two or more droplets, merging multiple droplets, agitating a droplet to mix the droplet, holding a droplet in place, or moving a droplet to another location on the element array.

16. The control method of claim 1, wherein controlling the actuation voltages applied to the array elements based on the test metric comprises:
determining whether a fault condition is present corresponding to a droplet not actuating; and
outputting an error message from the EWOD device to inform a user when the fault condition is present.

17. The control method of claim 16, wherein determining whether the fault condition is present comprises determining whether a combination of metrics of the droplet is suitable or unsuitable for performing a desired droplet manipulation operation.

18. A microfluidic system comprising:
an electrowetting on dielectric (EWOD) device including an element array configured to receive one or more liquid droplets, the element array comprising a plurality of individual array elements;
a control system configured to control actuation voltages applied to the element array to perform manipulation operations as to the one or more liquid droplets; and
a sensor for sensing a state of the one or more liquid droplets;
wherein the control system is programmed to perform the steps of the control method of claim 1.

19. The microfluidic system of claim 18, wherein the sensor is an optical sensor external from the EWOD device and/or sensor circuitry integrated into array element circuitry of each of the plurality of individual array elements.

20. A non-transitory computer-readable medium storing program code which is executed by a processing device for controlling actuation voltages applied to array elements of an element array of an electrowetting on dielectric (EWOD) device for performing droplet manipulations on droplets on the element array, the program code being executable by the processing device to perform the steps of:
applying an electrowetting actuation pattern of the actuation voltages to actuate a liquid droplet dispensed onto the element array to modify a footprint of the droplet, wherein the footprint of the droplet is a defined shape and a location of a centroid of the droplet, from a first state having an initial footprint to a second state having a modified footprint;
sensing the modified footprint with a sensor;
determining a test metric from sensing the modified footprint indicative of one or more droplet properties indicative of a droplet response of the liquid droplet to the electrowetting actuation pattern; and
determining an optimum actuation pattern for subsequent droplet manipulations based on the test metric and controlling the actuation voltages applied to the array elements in accordance with the optimum actuation pattern.

* * * * *